(12) United States Patent
Shin et al.

(10) Patent No.: US 10,769,258 B2
(45) Date of Patent: Sep. 8, 2020

(54) ELECTRONIC DEVICE FOR PERFORMING AUTHENTICATION USING MULTIPLE AUTHENTICATION MEANS AND METHOD FOR OPERATING THE SAME

(71) Applicant: SAMSUNG ELECTRONICS CO., LTD., Suwon-si, Gyeonggi-do (KR)

(72) Inventors: Hyung-Woo Shin, Seoul (KR); Hye-Mi Lee, Seoul (KR); Jin-Hoon Cho, Yongin-si (KR); Pil-Joo Yoon, Seongnam-si (KR); Hae-Dong Lee, Daegu (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 280 days.

(21) Appl. No.: 15/915,422

(22) Filed: Mar. 8, 2018

(65) Prior Publication Data

US 2018/0260550 A1    Sep. 13, 2018

(30) Foreign Application Priority Data

Mar. 9, 2017 (KR) .................. 10-2017-0030235

(51) Int. Cl.
*G06F 21/00* (2013.01)
*G06F 21/32* (2013.01)
(Continued)

(52) U.S. Cl.
CPC .............. *G06F 21/32* (2013.01); *G06F 21/31* (2013.01); *G06F 21/36* (2013.01);
(Continued)

(58) Field of Classification Search
CPC ........... G06F 21/32; G06F 21/31; G06F 21/36
(Continued)

(56) References Cited

U.S. PATENT DOCUMENTS 8,295,894 B2 * 10/2012 Macfarlane ........ G08B 13/1481
340/5.8
9,305,151 B1 * 4/2016 Dotan .................... G06F 21/31
(Continued)

FOREIGN PATENT DOCUMENTS

KR    10-1032863    4/2011

OTHER PUBLICATIONS

AndroidCentral (https://forums.androidcentral.com/samsung-galaxy-s7/649354-fingerprint-unlock-quagmire-if-unsuccessful-1-finger-requires-30-second-wait.html, Dec. 2016).*

*Primary Examiner* — Harris C Wang
(74) *Attorney, Agent, or Firm* — Nixon & Vanderhye P.C.

(57) ABSTRACT

According to an embodiment of the present disclosure, an electronic device may comprise a first sensor configured to obtain first biometric information of a first authentication level from a user, a second sensor configured to obtain the first biometric information and/or second biometric information of a second authentication level higher than the first authentication level from the user, a memory configured to store at least one piece of biometric information authenticated in relation with the user, and a processor configured to compare the at least one piece of biometric information with the first biometric information obtained through the first sensor while the electronic device operates in a locked state, to activate a timer to stop input to the first sensor for a designated time when authentication based on the first biometric information fails a designated number of times based on the comparison of the first biometric information, to obtain the second biometric information through the second sensor while the timer is active, and to deactivate the timer when the second biometric information is authenticated based on the at least one piece of biometric information.

20 Claims, 18 Drawing Sheets

(51) Int. Cl.
  *G06K 9/00* (2006.01)
  *G10L 17/22* (2013.01)
  *G06F 21/36* (2013.01)
  *G06F 21/31* (2013.01)
  *G10L 17/10* (2013.01)

(52) U.S. Cl.
  CPC ..... *G06K 9/00013* (2013.01); *G06K 9/00604* (2013.01); *G06K 9/00892* (2013.01); *G06K 9/00993* (2013.01); *G10L 17/10* (2013.01); *G10L 17/22* (2013.01)

(58) Field of Classification Search
  USPC .......................................................... 726/19
  See application file for complete search history.

(56) References Cited

U.S. PATENT DOCUMENTS

| | | | | |
|---|---|---|---|---|
| 9,349,035 | B1* | 5/2016 | Gerber | G06K 9/00013 |
| 10,042,994 | B2* | 8/2018 | Perna | G06K 9/00617 |
| 10,395,128 | B2* | 8/2019 | Van Os | G06K 9/00255 |
| 2003/0051138 | A1* | 3/2003 | Maeda | H04L 63/0861 |
| | | | | 713/168 |
| 2005/0071635 | A1* | 3/2005 | Furuyama | G06F 21/32 |
| | | | | 713/168 |
| 2010/0088509 | A1* | 4/2010 | Fedronic | G06F 21/32 |
| | | | | 713/159 |
| 2010/0162386 | A1* | 6/2010 | Li | G06F 21/32 |
| | | | | 726/19 |
| 2012/0098948 | A1* | 4/2012 | Lee | G06K 9/6292 |
| | | | | 348/77 |
| 2012/0297205 | A1* | 11/2012 | Yuen | G06F 21/44 |
| | | | | 713/193 |
| 2013/0081119 | A1* | 3/2013 | Sampas | G06Q 20/3224 |
| | | | | 726/7 |
| 2015/0074418 | A1* | 3/2015 | Lee | G06F 21/45 |
| | | | | 713/186 |
| 2016/0294837 | A1* | 10/2016 | Turgeman | G06F 3/04886 |
| 2017/0041314 | A1* | 2/2017 | Shin | H04L 9/085 |
| 2017/0118642 | A1* | 4/2017 | Fukui | H04L 63/0861 |
| 2017/0193210 | A1* | 7/2017 | Liu | G06F 21/32 |
| 2018/0203986 | A1* | 7/2018 | Huang | H04L 9/3231 |
| 2018/0260550 | A1* | 9/2018 | Shin | G06K 9/00892 |
| 2019/0139029 | A1* | 5/2019 | Kadiwala | H04L 9/0825 |

\* cited by examiner

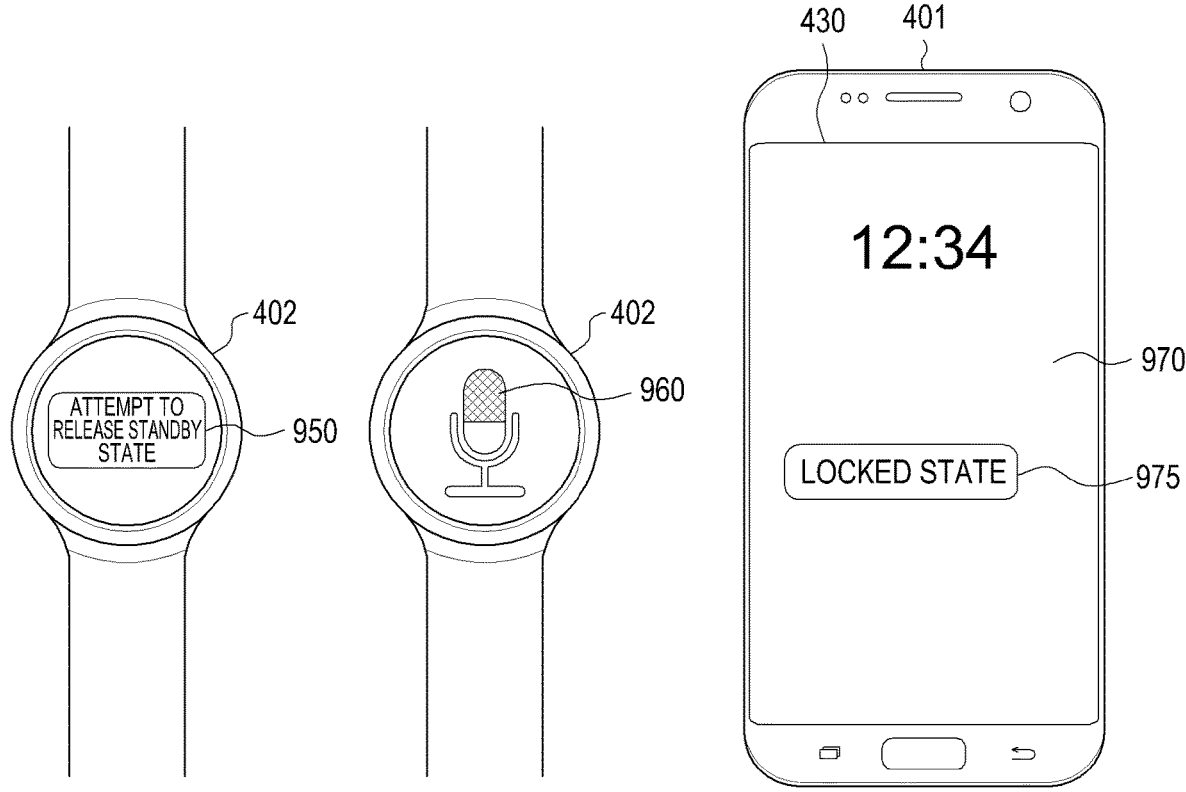

ELECTRONIC DEVICE FOR PERFORMING AUTHENTICATION USING MULTIPLE AUTHENTICATION MEANS AND METHOD FOR OPERATING THE SAME

CROSS-REFERENCE TO RELATED APPLICATION

This application is based on and claims priority under 35 U.S.C. § 119 to a Korean patent application filed in the Korean Intellectual Property Office on Mar. 9, 2017 and assigned Serial No. 10-2017-0030235, the disclosure of which is incorporated by reference herein in its entirety.

TECHNICAL FIELD

The present disclosure relates to electronic devices performing authentication using a user's multiple authentication means and methods for operating the same.

DISCUSSION OF RELATED ART

With the recent development of electronic and communication technology, electronic devices contain a number of pieces of personal information, which is raising security concerns about electronic devices. For security purposes of electronic devices to protect personal information contained in the electronic devices, more attention is directed to user authentication methods. As users' biometric information may be obtained using an electronic device, authentication methods using such biometric information are also in more frequent use.

Conventional electronic devices are unable to perform authentication during a prescribed time to prevent anti-spoofing upon occurrence of a predetermined number of consecutive authentication failures.

Where a fingerprint sensor is embedded in the display, consecutive authentication failures due to manipulation by an unregistered user may unintentionally lead to a standby state in which authentication cannot be achieved. The presence of a foreign body at the fingerprint sensor of the display may cause a lowering in the recognition rate, and resultantly, authentication failure, although a registered user attempts authentication.

SUMMARY

According to various embodiments of the present disclosure, there is disclosed an electronic device that releases a standby state based on authentication levels of a first authentication type and a second authentication scheme when first authentication using the first authentication type fails so that it enters into a standby state to put the first authentication on hold for a predetermined time and second authentication using the second authentication type succeeds.

According to an embodiment of the present disclosure, an electronic device may comprise a first sensor configured to obtain first biometric information of a first authentication level from a user, a second sensor configured to obtain the first biometric information and/or second biometric information of a second authentication level higher than the first authentication level from the user, a memory configured to store at least one piece of biometric information authenticated in relation with the user, and a processor, wherein the processor may be configured to compare the at least one piece of biometric information with the first biometric information obtained through the first sensor while the electronic device operates in a locked state, to activate a timer to stop input to the first sensor for a designated time when authentication on the first biometric information fails a designated number of times based on the comparison of the first biometric information, to obtain the second biometric information through the second sensor while the timer is active, and to deactivate the timer when the second biometric information is authenticated based on the at least one piece of biometric information.

According to an embodiment of the present disclosure, an electronic device may comprise a touchscreen, a first sensor configured to obtain first authentication information of a first type, a second sensor configured to obtain second authentication information of a second type, and a processor, wherein the processor may be configured to, when first authentication on the first authentication information of the first type to release a locked state of the electronic device using the first sensor fails a designated number of times, enter into a standby state to put input related to the first authentication on hold for a designated time, and when second authentication on the second authentication information of the second type using the second sensor succeeds before the designated time expires, to release the standby state.

According to an embodiment of the present disclosure, a method for operating an electronic device may comprise, when first authentication on first authentication information of a first type to release a locked state of the electronic device fails a designated number of times, entering into a standby state to put input related to the first authentication on hold for a designated time, performing second authentication on second authentication information of a second type obtained through a second sensor before the designated time expires, and releasing the standby state when the second authentication succeeds.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

These and other aspects, features and attendant advantages of the present disclosure will be more readily appreciated from the following detailed description, taken in conjunction with the accompanying drawings, in which:

FIGS. 9A, 9B, 9C, 9D, 9E, 9F, 9G and 9H are diagrams illustrating example user interfaces provided by a first electronic device and a second electronic device according to an embodiment of the present disclosure;

Throughout the drawings, like reference numerals will be understood to refer to like parts, components, and structures.

DETAILED DESCRIPTION

Figure 1:
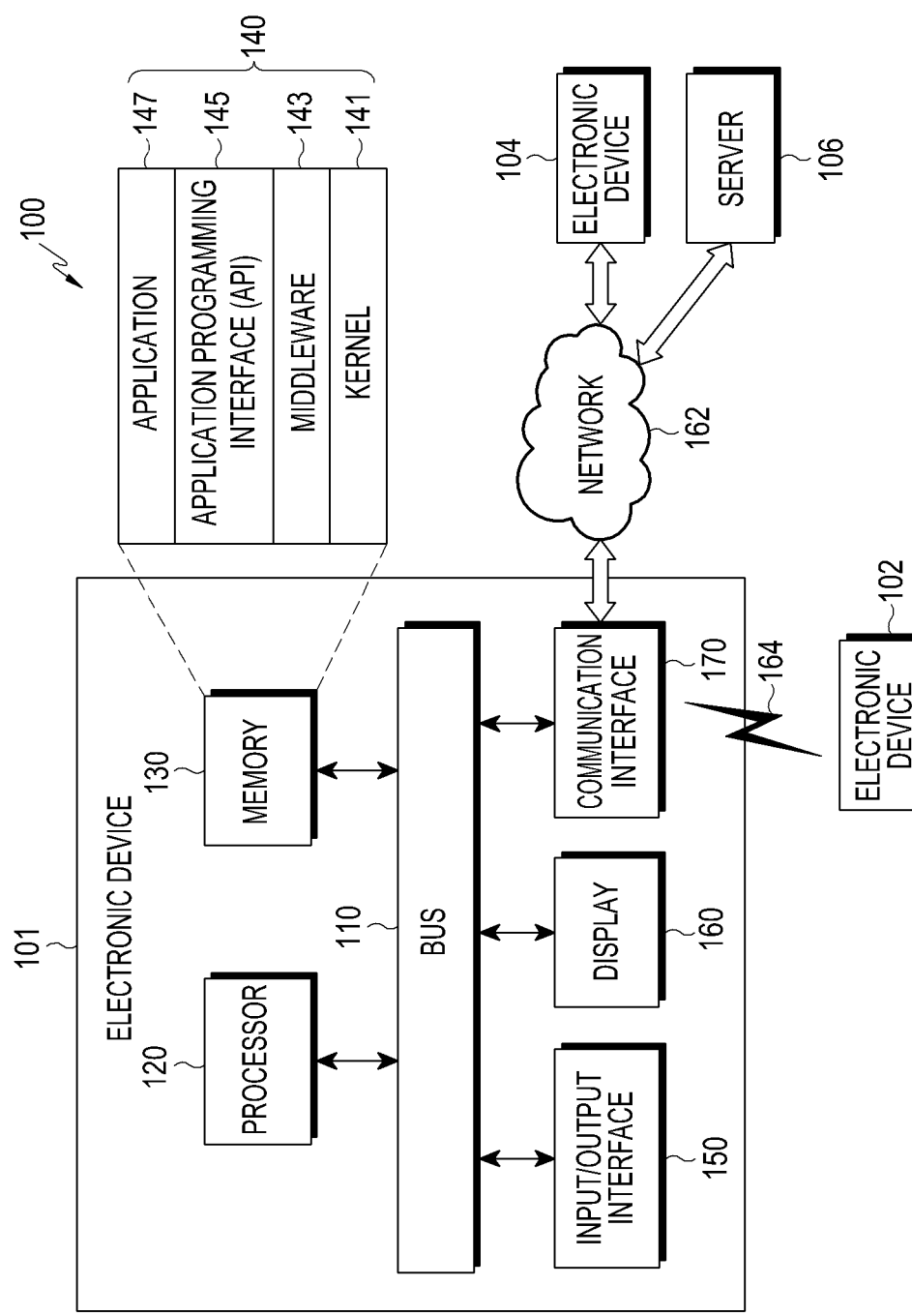
FIG. 1 is a block diagram illustrating an electronic device and in a network environment according to an embodiment of the present disclosure.

Hereinafter, various example embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may be used to refer to various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software or any combination thereof in the context. Rather, the term "configured to" may refer to a situation in which a device can perform an operation together with another device or parts. For example, the term "processor configured (or set) to perform A, B, and C" may refer, for example, and without limitation, to a generic-purpose processor (e.g., a CPU or application processor) that may perform the operations by executing one or more software programs stored in a memory device or a dedicated processor (e.g., an embedded processor) for performing the operations, or the like.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device, or the like, but is not limited thereto. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device, or the like, but is not limited thereto. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame, or the like, but is not limited thereto.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler), or the like, but is not limited thereto. According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves), or the like, but is not limited thereto. According to embodiments of the present disclosure, the electronic device may be flexible or may be a combination of two or more of the above-enumerated electronic devices. According to an embodiment of the present disclosure, the electronic device is not limited to the above-listed embodiments. As used herein, the term "user" may denote a human or another device (e.g., an artificial intelligent electronic device) using the electronic device.

Referring to FIG. 1, according to an embodiment of the present disclosure, an electronic device 101 is included in a network environment 100. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. In some embodiments, the electronic device 101 may exclude at least one of the components or may add another component.

The bus 110 may include a circuit for connecting the components 110 to 170 with one another and transferring communications (e.g., control messages or data) between the components.

The processor 120 may include various processing circuitry, such as, for example, and without limitation, one or more of a dedicated processor, a central processing unit (CPU), an application processor (AP), or a communication processor (CP), or the like. The processor 120 may perform control on at least one of the other components of the electronic device 101 or perform an operation or data processing relating to communication.

The memory 130 may include a volatile and/or non-volatile memory. For example, the memory 130 may store commands or data related to at least one other component of, e.g., the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control.

For example, the input/output interface 150 may include various input/output circuitry and transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display, or the like, but is not limited thereto. The display 160 may display, e.g., various contents (e.g., text, images, videos, icons, and/or symbols) to the user. The display 160 may include a touchscreen and may receive, e.g., a touch, gesture, proximity or hovering input using an electronic pen or a body portion of the user.

For example, the communication interface 170 may include various communication circuitry and set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device (e.g., the second external electronic device 104 or server 106), as exemplified with element 164.

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). According to an embodiment of the present disclosure, the wireless communication may include at least one of, e.g., wireless-fidelity (Wi-Fi), light-fidelity (Li-Fi), bluetooth, bluetooth low power (BLE), zigbee, near-field communication (NFC), magnetic secure transmission (MST), radio frequency (RF), or body area network (BAN) as denoted with element 164 of FIG. 1. According to an embodiment of the present disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
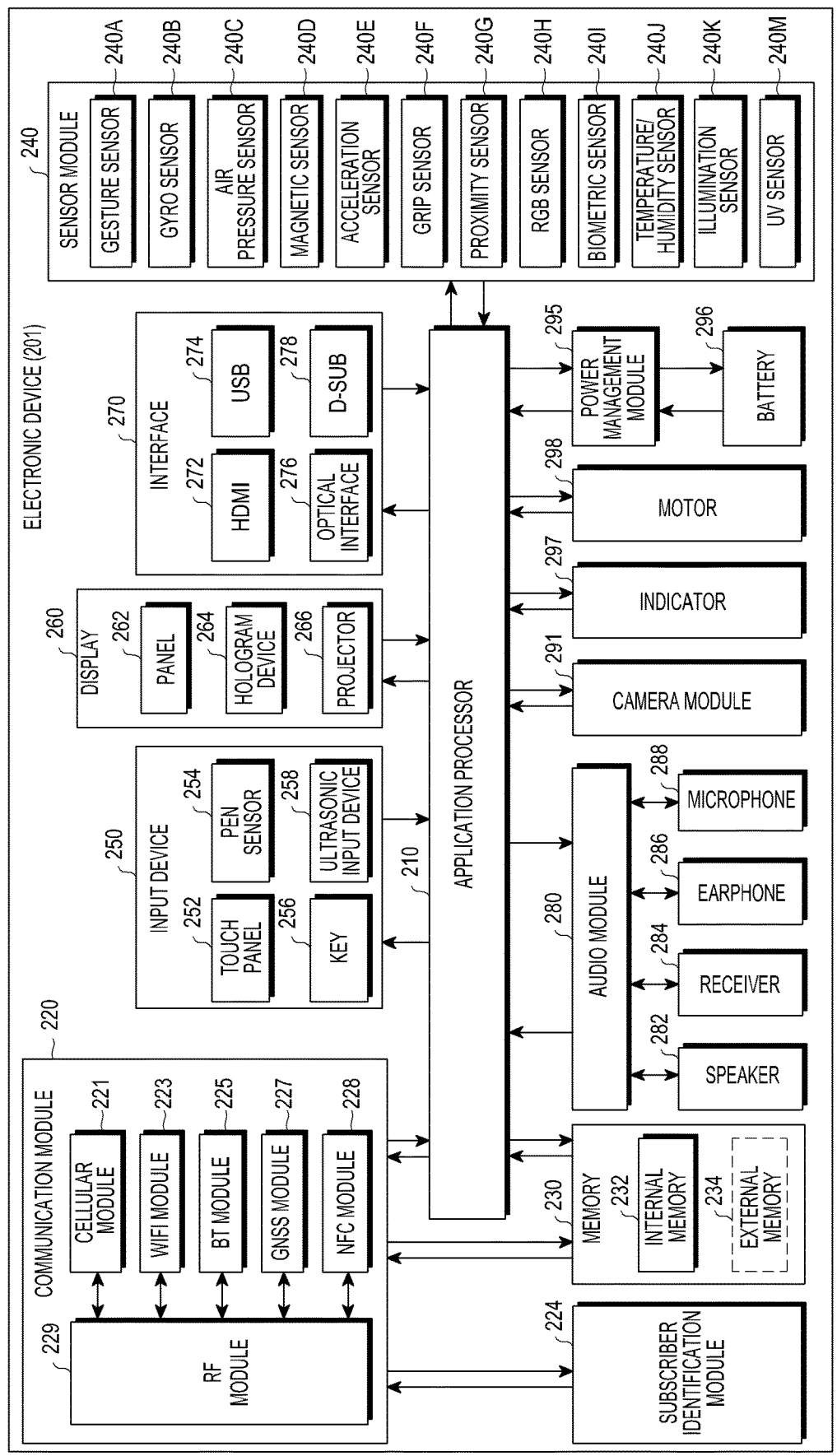
FIG. 2 is a block diagram illustrating an example electronic device according to an embodiment of the present disclosure.

FIG. 2 is a block diagram illustrating an electronic device 201 according to an embodiment of the present disclosure. An electronic device 201 may include the whole or part of, e.g., the electronic device 101 of FIG. 1. The electronic device 201 may include one or more processors (e.g., application processors (APs)) (e.g., including processing circuitry) 210, a communication module (e.g., including communication circuitry) 220, a subscriber identification module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170 of FIG. 1. The communication module 220 may include various modules including various communication circuitry, such as, for example, and without limitation, a cellular module 221, a wireless fidelity (Wi-Fi) module 223, a Bluetooth (BT) module 225, a GNSS module 227, a NFC module 228, and a RF module 229.

The cellular module 221 may provide, e.g., voice call, video call, messaging services, or internet services, through, e.g., a communication network. According to an embodiment of the present disclosure, the cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP). According to an embodiment of the present disclosure, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may transmit and receive, e.g., communication signals (e.g., radio frequency (RF) signals).

The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 and/or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 234 may be functionally or physically connected with the electronic device 201 via various interfaces.

For example, the sensor module 240 may measure a physical quantity or detect a motion state of the electronic device 201, and the sensor module 240 may convert the measured or detected information into an electrical signal. The sensor module 240 may include at least one of, e.g., a gesture sensor 240A, a gyro sensor 240B, an atmospheric (air) pressure sensor 240C, a magnetic sensor 240D, an acceleration sensor 240E, a grip sensor 240F, a proximity sensor 240G, a color sensor 240H (e.g., a red-green-blue (RGB) sensor, a biometric sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 1210 is in a sleep mode.

The input device 250 may include, various input circuitry, such as, for example, and without limitation, a touch panel 252, a (digital) pen sensor 254, a key 256, or an ultrasonic input device 258, or the like. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201.

The interface 270 may include various interface circuitry, such as, for example, and without limitation, a high definition multimedia interface (HDMI) 272, a USB 274, an optical interface 276, or a D-subminiature (D-sub) 278, or the like. The interface 270 may be included in e.g., the communication interface 170 shown in FIG. 1. Additionally or alternatively, the interface 270 may include a mobile high-definition link (MHL) interface, a secure digital (SD)

card/multimedia card (MMC) interface, or infrared data association (IrDA) standard interface.

The audio module 280 may converting, e.g., a sound signal into an electrical signal and vice versa. At least a part of the audio module 280 may be included in e.g., the input/output interface 150 as shown in FIG. 1. The audio module 280 may process sound information input or output through e.g., a speaker 282, a receiver 284, an earphone 286, or a microphone 288. For example, the camera module 291 may be a device for capturing still images and videos, and may include, according to an embodiment of the present disclosure, one or more image sensors (e.g., front and back sensors), a lens, an image signal processor (ISP), or a flash such as an LED or xenon lamp.

The power manager module 295 may manage power of the electronic device 201, for example. According to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave-based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery and/or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

Figure 3:
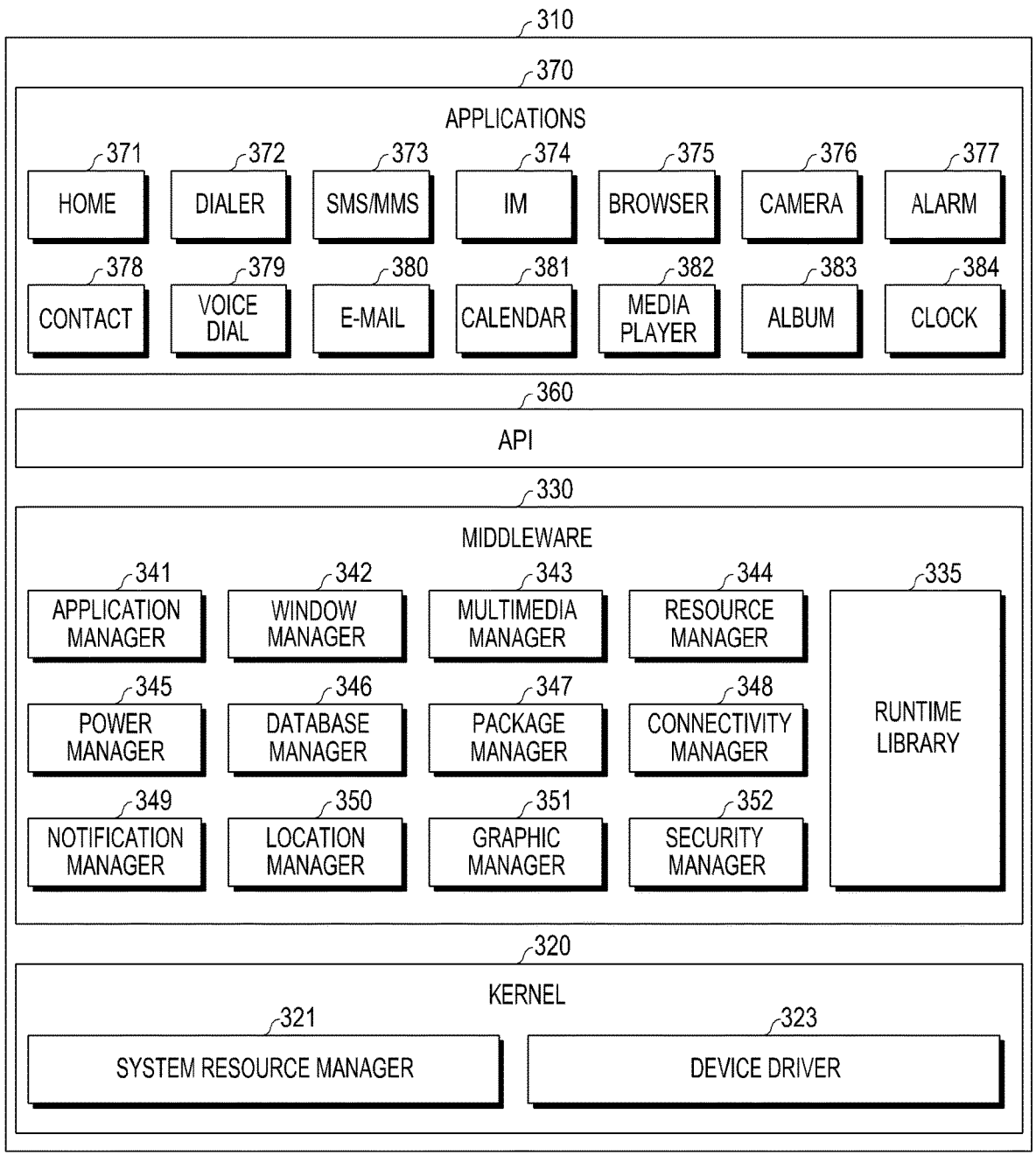
FIG. 3 is a block diagram illustrating an example program module according to an embodiment of the present disclosure.

FIG. 3 is a block diagram illustrating an example program module according to an embodiment of the present disclosure. According to an embodiment of the present disclosure, the program module 310 (e.g., the program 140) may include an operating system (OS) controlling resources related to the electronic device (e.g., the electronic device 101) and/or various applications (e.g., the application processor 147) driven on the operating system. The operating system may include, e.g., Android™, iOS™, Windows™, Symbian™, Tizen™, or Bada™.

Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the electronic devices 102 and 104 or server 106).

The kernel 320 may include, for example, and without limitation, a system resource manager 321 and/or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may use limited system resources in the electronic device or provide functions jointly required by applications 370. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and/or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341 may manage the life cycle of, e.g., the applications 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an embodiment of the present disclosure, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage graphic effects to be offered to the user and their related user interface. The security manager 352 may provide system security or user authentication, for example. According to an embodiment of the present disclosure, the middleware 330 may include a telephony manager for managing the voice or video call function of the electronic device or a middleware module able to form a combination of the functions of the above-described elements. According to an embodiment of the present disclosure, the middleware 330 may provide a module specified according to the type of the operating system. The middleware 330 may dynamically omit some existing components or add new components. The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an application that may provide, for example, and without limitation, a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, and/or a clock 384. Additionally, or alternatively, though not shown, the application 370 may include various other applications, such as, for example, and without limitation, a health-care (e.g., measuring the degree of workout or blood sugar), or provision of environmental information (e.g., provision of air pressure, moisture, or temperature information). According to an embodiment of the present disclosure, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present disclosure, the application 370 may include an application (e.g., a health-care application of a mobile medical device) designated according to an attribute of the external electronic device. According to an embodiment of the present disclosure, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

As used herein, the term "module" may include a unit configured in hardware, software, or firmware, or any combination thereof, and may interchangeably be used with other terms, e.g., "logic," "logic block," "part," or "circuit." The module may be a single integral part or a minimum unit or part of performing one or more functions. The module may be implemented mechanically or electronically and may include, for example, and without limitation, a dedicated processor, a CPU, an application-specific integrated circuit (ASIC) chip, field-programmable gate arrays (FPGAs), or programmable logic device, or the like, that has been known or to be developed in the future as performing some operations.

According to an embodiment of the present disclosure, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., CD-ROM, DVD, magnetic-optical medium (e.g., floptical disk), or an embedded memory. The instruction may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

Figure 4:
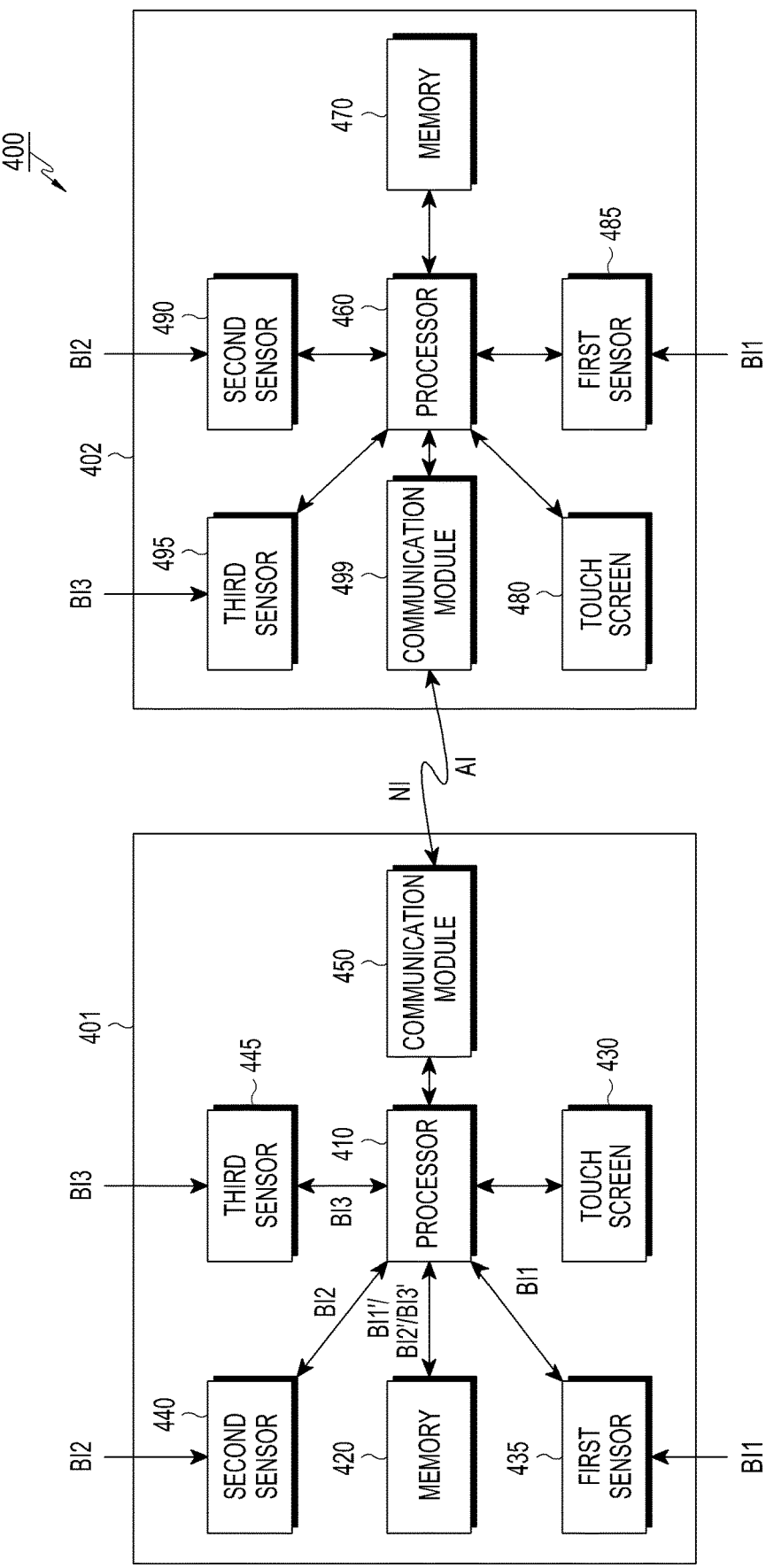
FIG. 4 is a block diagram illustrating an example electronic system according to an embodiment of the present disclosure.

FIG. 4 is a block diagram illustrating an example electronic system according to an embodiment of the present disclosure.

Referring to FIG. 4, an electronic system 400 may include a first electronic device 401 and a second electronic device 402.

The first electronic device 401 may be implemented to be substantially the same as, or similar to, the electronic devices 101 and 201 described above in connection with FIGS. 1 and 2. For example, the first electronic device 401 may be implemented as a smartphone, a tablet PC, a wearable device, and/or a terminal.

The first electronic device 401 may include a processor (e.g., including processing circuitry) 410, a memory 420, a touchscreen 430, a first sensor 435, a second sensor 440, a third sensor 445, and a communication module (e.g., including communication circuitry) 450.

The processor 410 may include various processing circuitry and control the overall operation of the first electronic device 401.

According to an embodiment of the present disclosure, the processor 410 may obtain first authentication information BI1 of a first authentication level via the first sensor 435. The processor 410 may also obtain second authentication information BI2 of a second authentication level via the second sensor 440. The processor 410 may also obtain third authentication information BI3 of a third authentication level via the third sensor 445.

The first authentication information BI1, the second authentication information BI2, and the third authentication information BI3 may include a user's biometric information. Further, the first authentication information BI1, the second authentication information BI2, and the third authentication information BI3 may include the same or different biometric information. For example, the biometric information may include information about, for example, and without limitation, the user's iris, retina, fingerprint, voice, face, finger vein, and/or blood vessel distribution, or the like.

According to an embodiment of the present disclosure, the first authentication information BI1, the second authentication information BI2, and the third authentication information BI3 may have different authentication levels. In this case, authentication level may refer, for example, to a criterion for measuring the security of authentication information. An authentication level may be set by the user or automatically based on the type of authentication information (e.g., iris, fingerprint, retina, and/or voice). For example, the first authentication information BI1 may have a first authentication level, the second authentication information BI2 may have a second authentication level, and the third authentication information BI3 may have a third authentication level.

For example, the processor 410 may set the first authentication level to be higher or lower than the second authentication level. The processor 410 may set the first authentication level to be higher or lower than the third authentication level.

The processor 410 may perform first authentication using the first sensor 435 to release the locked state of the electronic device 401. For example, the processor 410 may compare the first authentication information BI1 obtained via the first sensor with authentication information BI1' stored in the memory 420 and perform the first authentication according to a result of the comparison. At this time, the first authentication may mean an authentication operation to determine whether the user is one registered in the electronic device 401 using the first authentication information BI1.

When the first authentication information BI1 is the same or significantly similar (e.g., 95% or more same) to the authentication information BI1' stored in the memory 420, the processor 410 may determine that the first authentication has succeeded. In contrast, unless the first authentication information BI1 is the same or significantly similar to the authentication information BI1' stored in the memory 420, the processor 410 may determine that the first authentication has failed.

When the first authentication using the first sensor 435 to release the locked state of the electronic device 401 fails a predetermined number of times (e.g., the number of times may be set by the user or automatically), the processor 410 may enter into a standby state to put the first authentication on hold for a predetermined (or designated) time. At this time, the standby state may refer, for example, to a state in which the first authentication is put on hold for the predetermined time. For example, in the standby state, the processor 410 may abstain from, or stop, receiving an input for the first authentication during the predetermined time.

For example, where the authentication on the first authentication information fails a designated number of times, the processor 410 may activate a timer to stop input to the first sensor for the predetermined time. While the timer remains active, the processor 410 may abstain from receiving an input for the first authentication. While the timer remains active, the processor 410 may obtain the second authentication information BI2 via the second sensor and perform second authentication on the second authentication information BI2.

Before the predetermined time expires, the processor 410 may perform the second authentication using the second sensor 440. When the second authentication succeeds before the predetermined time expires, the processor 410 may compare the second authentication level with the first authentication level of the first authentication information BI1 and release the standby state (e.g., the state where the timer is active) of the electronic device 401 depending on a result of the comparison.

Upon determining that the second authentication information BI2 is the same or significantly similar (e.g., 95% or more alike) to the authentication information BI2' stored in the memory 420, the processor 410 may determine that the second authentication has succeeded. When the second authentication succeeds, the processor 410 may release the standby state. Further, when the second authentication succeeds, the processor 410 may deactivate the timer.

According to an embodiment of the present disclosure, when the first authentication level is higher than the second authentication level, the processor 410 may release the standby state. When the first authentication level is higher than the second authentication level, the processor 410 may release the standby state but not the locked state. For example, when the first authentication level is higher than the second authentication level, the processor 410 may release the standby state and display a first screen as per the release of the standby state on the touchscreen 430. When the standby state is released, the processor 410 may also display the first screen to request the first authentication information BI1 for releasing the locked state. For example, the first screen may mean a screen corresponding to the state in which the standby state has been released.

When the first authentication level is lower than the second authentication level, the processor 410 may release the locked state as well as the standby state. For example, when the first authentication level is lower than the second authentication level, the processor 410 may release the standby state and display a second screen, where the locked state has been released as per the release of the standby state, on the touchscreen 430. For example, the second screen may mean a screen corresponding to the state in which the locked state has been released.

According to an embodiment of the present disclosure, in the standby state, the processor 410 may display, on the touchscreen 430, a request for the second authentication information BI2 or third authentication information BI3 to release the standby state.

According to an embodiment of the present disclosure, when the second authentication using the second authentication information BI2 among the plurality of pieces of authentication information in the standby state is complete, the processor 410 may also display, on the touchscreen 430, information indicating that the standby state and the locked state may be released. When the third authentication using the third authentication information BI3 among the plurality of pieces of authentication information in the standby state is complete, the processor 410 may also display, on the touchscreen 430, information indicating that the standby state may be released. At this time, the authentication level of the second authentication information BI2 may be higher than the authentication level of the first authentication information BI1, and the authentication level of the third authentication information BI3 may be lower than the authentication level of the first authentication information BI1.

According to an embodiment of the present disclosure, the processor 410 may count failures in the first authentication for a portion of the sensing area of the first sensor 435 and determine whether the first sensor 435 has been contaminated based on the number of failures in the first authentication that have occurred in the portion of the sensing area of the first sensor 435.

For example, the processor 410 may determine whether matching errors (or matching failures) have consecutively occurred in the portion (e.g., the same area) of the sensing area of the first sensor 435. For example, where a predetermined number of matching errors (or matching failures) consecutively occur in the portion of the sensing area of the first sensor 435, the processor 410 may determine that the first sensor 435 has been contaminated.

For example, based on the number of failures in the first authentication in the portion of the sensing area of the first sensor 435 (e.g., upon determining that the first sensor 435 has been contaminated), the processor 410 may display, on the touchscreen 430, a message indicating the contamination of the first sensor 435. Further, based on the number of failures in the first authentication in the portion of the sensing area of the first sensor 435 (e.g., upon determining that the first sensor 435 has been contaminated), the processor 410 may mitigate conditions for entry into the standby state. For example, based on the number of failures in the first authentication in the portion of the sensing area of the first sensor 435 (e.g., upon determining that the first sensor 435 has been contaminated), the processor 410 may increase the number of times designated for the first authentication to enter into the standby state (e.g., from five times to ten times).

According to an embodiment of the present disclosure, upon entry of the first electronic device 401 into the standby state, the processor 410 may transmit notification information NI for indicating that the first electronic device 401 enters into the standby state via the communication module 450 to the second electronic device 402.

According to an embodiment of the present disclosure, the notification information NI may contain information to control the second electronic device 402 to display a request for the second authentication information BI2 in order to perform the second authentication using the second electronic device 402.

For example, in response to the notification information NI, the second electronic device 402 may display the request for the second authentication information BI2 on the touchscreen 480. Further, in response to the notification information NI, the second electronic device 402 may display a request for the first authentication information BI1 and/or third authentication information BI3 on the touchscreen 480.

When the second authentication using the second authentication information BI2 among the plurality of pieces of authentication information is complete, the second electronic device 402 may also display, on the touchscreen 480, information indicating that the standby state and the locked state may be released. When the first authentication using the first authentication information BI1 among the plurality of pieces of authentication information or the third authentication using the third authentication information BI3 among the plurality of pieces of authentication information is complete, the second electronic device 402 may also display, on the touchscreen 480, information indicating that the standby state may be released. At this time, the authentication level of the second authentication information BI2 may be equal or higher than the authentication levels of the first authentication information BI1 and the third authentication information BI3.

According to an embodiment of the present disclosure, when the second authentication using the second electronic device succeeds before the predetermined time for the standby state expires, the processor 410 may receive information AI about the success in the second authentication from the second electronic device 402 through the communication module 450. The processor 410 may compare the first authentication level with the second authentication level and release the standby state of the first electronic device 401 depending on a result of the comparison.

According to an embodiment of the present disclosure, the processor 410 may obtain fourth authentication information of a fourth authentication level via the touchscreen 430 before the predetermined time for the standby state expires.

For example, the fourth authentication information may contain digital authentication information (e.g., a designated pattern and/or pin code). The fourth authentication level may mean a criterion for measuring the security of the fourth authentication information and may be set automatically or by the user. For example, the processor 410 may set the first authentication level to be higher or lower than the fourth authentication level.

When the fourth authentication information is the same as authentication information stored in the memory 420, the processor 410 may determine that the fourth authentication has succeeded.

When the fourth authentication using the fourth authentication information succeeds, the processor 410 may compare the first authentication level with the fourth authentication level and release the standby state of the first electronic device 401 depending on a result of the comparison.

The memory 420 may store data for the operation of the first electronic device 401. For example, the memory 420 may be implemented as a non-volatile memory.

According to an embodiment of the present disclosure, the memory 420 may store at least one piece of authentication information. For example, the memory 420 may store at least one piece of biometric information about the user. The memory 420 may also store designated pattern information and/or pin code information.

The touchscreen 430 may display a screen indicating the state of the first electronic device 401 under the control of the processor 410. For example, the touchscreen 430 may display a screen indicating the locked state. Further, the touchscreen 430 may display a screen indicating that the locked state has been released.

The touchscreen 430 may display a screen indicating the standby state. At this time, the touchscreen 430 may display an activated timer corresponding to the standby state. Further, the touchscreen 430 may display a screen for the state where the standby state has been released.

The touchscreen 430 may obtain information about a designated pattern and/or pin code according to a touch input. The touchscreen 430 may transmit the obtained information about the designated pattern and/or pin code to the processor 410.

The first sensor 435 may obtain the first authentication information BI1. The first sensor 435 may transmit the first authentication information BI1 of the processor 410. For example, the first sensor 435 may include a fingerprint sensor to sense the user's fingerprint. The first sensor 435 may obtain the user's fingerprint information and transmit the fingerprint information to the processor 410. The fingerprint sensor may include at least one of an optical fingerprint sensor, a capacitive fingerprint sensor, and/or an ultrasonic-type fingerprint sensor. Further, the first sensor 435 may be included in the touchscreen 430.

The second sensor may obtain the second authentication information BI2. The second sensor 440 may transmit the second authentication information BI2 to the processor 410. For example, the second sensor 440 may include an image sensor to sense the user's iris (or retina) and/or face. The second sensor 440 may obtain information about the user's iris (or retina) and/or face and transmit the obtained information about the iris (or retina) and/or face to the processor 410.

The third sensor 445 may obtain the third authentication information BI3. The third sensor 445 may transmit the third authentication information BI3 to the processor 410. The third sensor 445 may include a voice sensor to sense the user's voice. The third sensor 445 may obtain the user's voice information and transmit the obtained voice information to the processor 410.

The communication module 450 may include various communication circuitry and perform communication functions with the second electronic device 402. For example, the communication module 450 may transmit the notification information NI to indicate the standby state of the first electronic device 401. Further, the communication module 450 may receive the information AI about a success in authentication using the second electronic device 402.

The second electronic device 402 may be implemented to be substantially the same or similar to the electronic devices 102 and 201 described above in connection with FIGS. 1 and 2. For example, the second electronic device 402 may be implemented, for example, and without limitation, as a server, a smartphone, a tablet PC, a wearable device, and/or a terminal connected with the first electronic device 401, or the like.

The second electronic device 402 may include a processor (e.g., including processing circuitry) 460, a memory 470, a touchscreen 480, a first sensor 485, a second sensor 490, a third sensor 495, and a communication module (e.g., including communication circuitry) 499.

The first sensor 485, the second sensor 490, and the third sensor 495 may be implemented to be substantially the same as, or similar to, the first sensor 435, the second sensor 440, and the third sensor 445, respectively, of the first electronic device 401. For example, the first sensor 485 may obtain the first authentication information BI1, the second sensor 490 may obtain the second authentication information BI2, and the third sensor 495 may obtain the third authentication information BI3.

The processor 460 may include various processing circuitry and control the overall operation of the second electronic device 402.

According to an embodiment of the present disclosure, the processor 460 may perform authentication operations using the first sensor 485, the second sensor 490, and the third sensor 495. The authentication operation performed by the processor 460 may be implemented to be substantially the same or similar to the authentication operation performed by the first electronic device 401.

The processor 460 may receive notification information NI to indicate the standby state of the first electronic device 401 from the first electronic device 401 via the communication module 499. The processor 460 may transmit information AI about a success in authentication using the second electronic device 402 via the communication module 499 to the first electronic device 401.

The memory 470 may store data for the operation of the second electronic device 402. For example, the memory 470 may be implemented as a non-volatile memory.

According to an embodiment of the present disclosure, the memory 470 may store at least one piece of authentication information. For example, the memory 470 may store at least one piece of biometric information about the user. The memory 470 may also store designated pattern information and/or pin code information.

The touchscreen 480 may display a screen indicating the state of the first electronic device 401 under the control of the processor 460. For example, the touchscreen 480 may display a screen indicating that the first electronic device 401 is in the standby state. At this time, the touchscreen 480 may display a timer corresponding to the standby state of the first electronic device 401.

The touchscreen 480 may obtain information about a designated pattern and/or pin code according to a touch input. The touchscreen 480 may transmit the obtained information about the designated pattern and/or pin code to the processor 460.

The communication module 499 may include various communication circuitry and perform communication functions with the first electronic device 401. For example, the communication module 499 may receive notification information NI to indicate the standby state of the first electronic device 401 from the first electronic device 401. The communication module 499 may transmit information AI about a success in authentication using the second electronic device 402 to the first electronic device 401.

Figure 5:
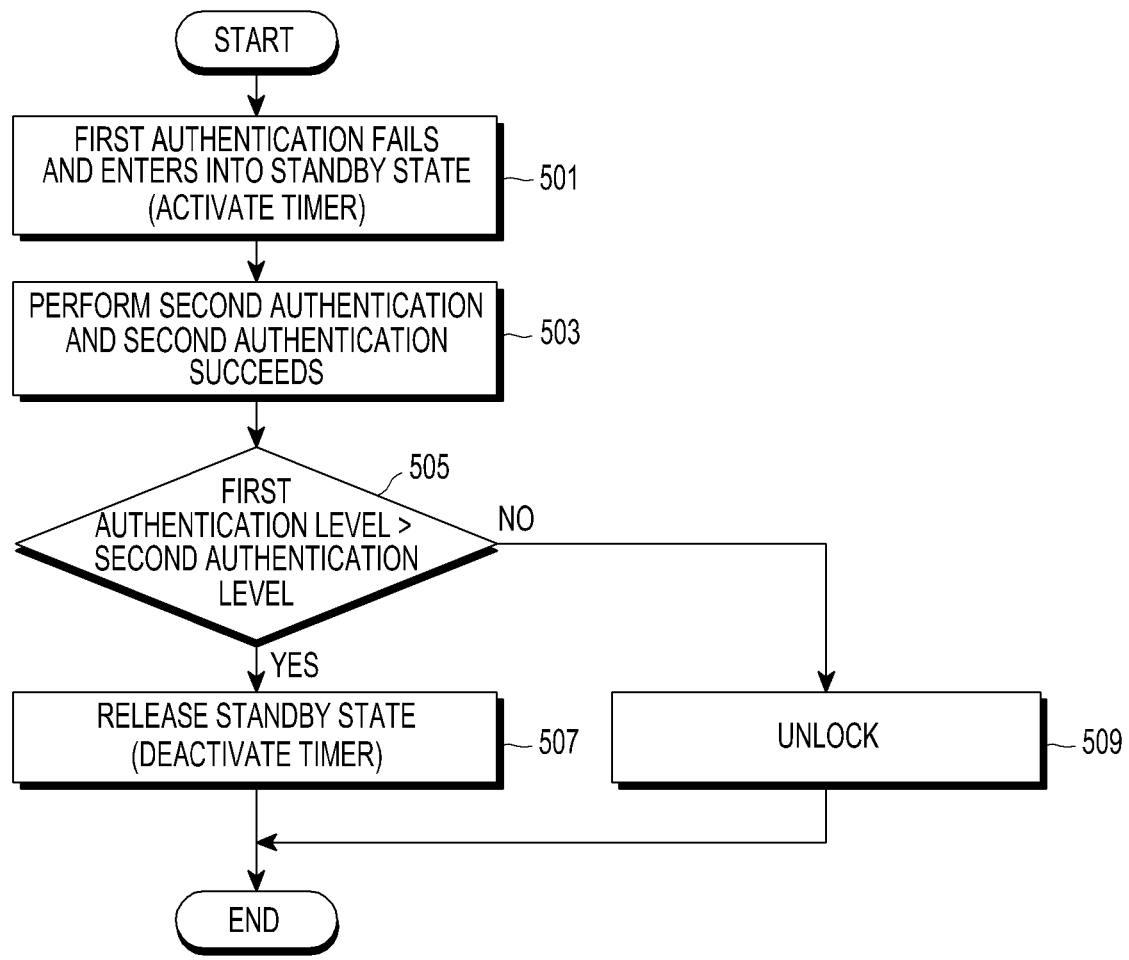
FIG. 5 is a flowchart illustrating example operations of a first electronic device according to an embodiment of the present disclosure.

FIG. 5 is a flowchart illustrating example operations of a first electronic device according to an embodiment of the present disclosure.

Referring to FIG. 5, the first electronic device 401 (e.g., the processor 410) may perform first authentication through the first sensor 435 to release the locked state.

According to an embodiment of the present disclosure, when the first authentication fails a designated number of times, the first electronic device 401 may enter into the standby state (501). For example, upon entry into the standby state, the first electronic device 401 may activate the timer to put the first authentication on hold for a predetermined time. At this time, the first electronic device 401 may display the time to put the first authentication on hold through the timer.

Before the predetermined time expires, the first electronic device 401 may perform the second authentication via the second sensor 440 (503). When the second authentication information BI2 obtained through the second sensor 440 is the same or significantly similar to the authentication information BI2' stored in the memory 420, the first electronic device 401 may determine that the second authentication has succeeded (503). Further, the first electronic device 401 may compare the first authentication level of the first authentication information BI1 with the second authentication level of the second authentication information BI2.

For example, when the first authentication level is higher than the second authentication level (yes in 505), the first electronic device 401 may release the standby state (507). For example, as the standby state is released, the first electronic device 401 may deactivate the timer.

When the first authentication level is the second authentication level or lower (no in 505), the first electronic device 401 may release the standby state and the locked state (509).

FIGS. 6A, 6B, 6C, 6D, 6E and 6F are diagrams illustrating example user interfaces provided by a first electronic device according to an embodiment of the present disclosure.

Figure 6A:
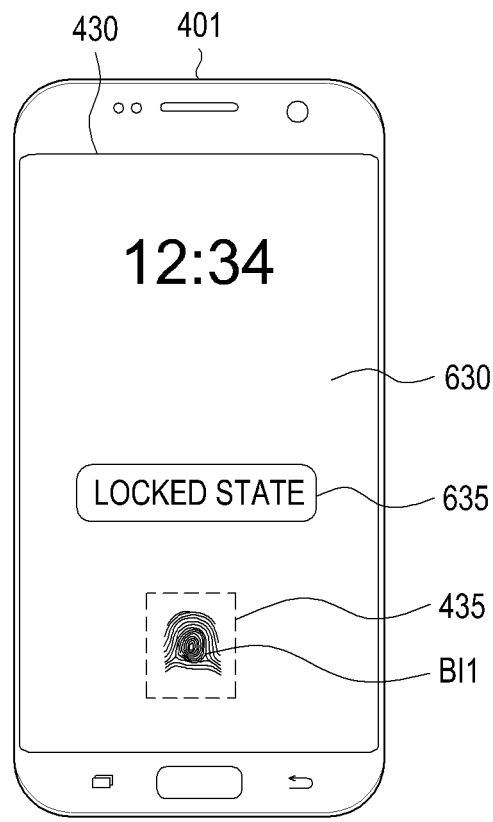
FIGS. 6A, 6B, 6C, 6D, 6E and 6F are diagrams illustrating example user interfaces provided by a first electronic device according to an embodiment of the present disclosure.

Referring to FIG. 6A, the first electronic device 401 (e.g., the processor 410) may display, on the touchscreen 430, a lock screen 630 for the locked state. For example, the lock screen 630 may refer, for example, to a screen in which the first electronic device 401 is unable to perform a certain function without authentication. The first electronic device 401 may display an object 635 to indicate the 'locked state' on the lock screen 630.

The first electronic device 401 may perform the first authentication to release the locked state using the first sensor 435. For example, where the first authentication information BI1 is the user's fingerprint information, the first electronic device 401 may obtain the user's fingerprint information using the first sensor 435 and perform the first authentication to determine whether the user is a registered user using the obtained fingerprint information. The first sensor 435 may be implemented to be included in the touchscreen 430.

Figure 6B:
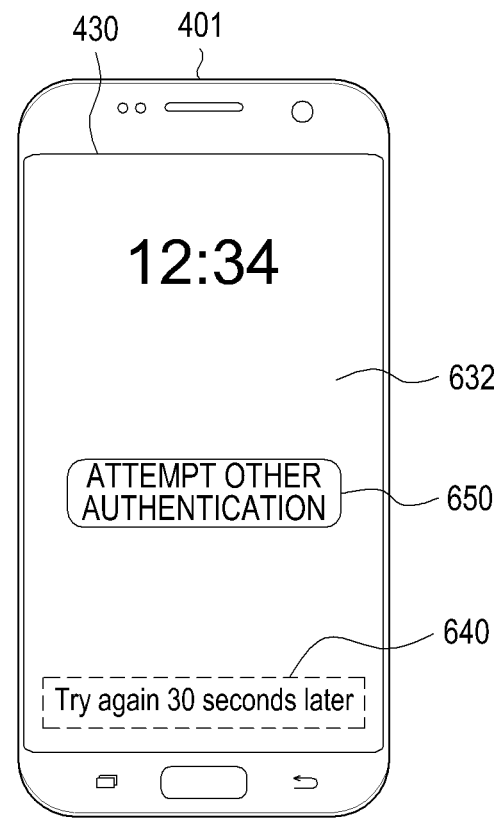

Referring to FIG. 6B, when the first authentication fails a designated number of times, the first electronic device 401 may display, on the touchscreen 430, a standby screen 632 to put the first authentication corresponding to the failure in the first authentication on hold for a predetermined time. Further, the first electronic device 401 may activate the timer to put the first authentication on hold for the predetermined time and display information 640 about the timer on the standby screen 632. For example, the time contained in the information 640 about the timer may be varied in real-time.

The first electronic device 401 may display, on the standby screen 632, an object 650 to indicate an 'attempt other authentication' to attempt other authentication before the predetermined time expires. For example, when the first electronic device moves or a predetermined time elapses, the first electronic device 401 may display, on the standby screen 632, the object 650 indicating the 'attempt other authentication.' For example, the predetermined time may be shorter than the predetermined time for the standby state.

The first electronic device 401 may perform different authentication than the first authentication in the standby state in which the standby screen 632 is displayed on the touchscreen 430. For example, the first electronic device 401 may perform the second authentication or third authentication in response to a touch input to the object 650 indicating the 'attempt other authentication.'

Figure 6C:
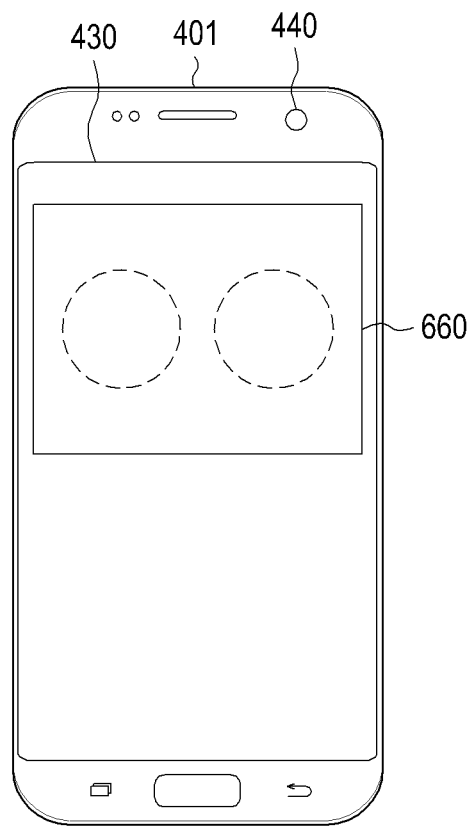

Referring to FIG. 6C, according to an embodiment of the present disclosure, the first electronic device 401 may perform the second authentication using the second authentication information. For example, the first electronic device 401 may perform the second authentication before the predetermined for the standby state expires.

The first electronic device 401 may display, on the touchscreen 430, an input window 660 for obtaining the second authentication information BI2 (e.g., a screen indicating the positions of both eyes to obtain iris information). The first electronic device 401 may activate the second sensor and display the input window 660 to obtain the second authentication information BI2. For example, where the second authentication information BI2 is the user's iris information, the first electronic device 401, upon displaying the input window 660, may activate the second sensor 440 (e.g., an image sensor), obtain the user's iris information using the second sensor 440, and perform the second authentication to determine whether the user is a registered user or not using the obtained iris information.

When the second authentication succeeds, the first electronic device 401 may compare the authentication level of the first authentication information BI1 with the authentication level of the second authentication information BI2 and release the standby state depending on a result of the comparison.

Figure 6D:

Referring to FIG. 6D, since the authentication level of the second authentication information BI2 (iris information) is higher than the authentication level of the first authentication information BI1 (fingerprint information), the first electronic device 401 may release the standby state and the locked state. For example, when the second authentication succeeds, the first electronic device 401 may display, on the touchscreen 430, a screen 670 corresponding to the release of the locked state.

Figure 6E:
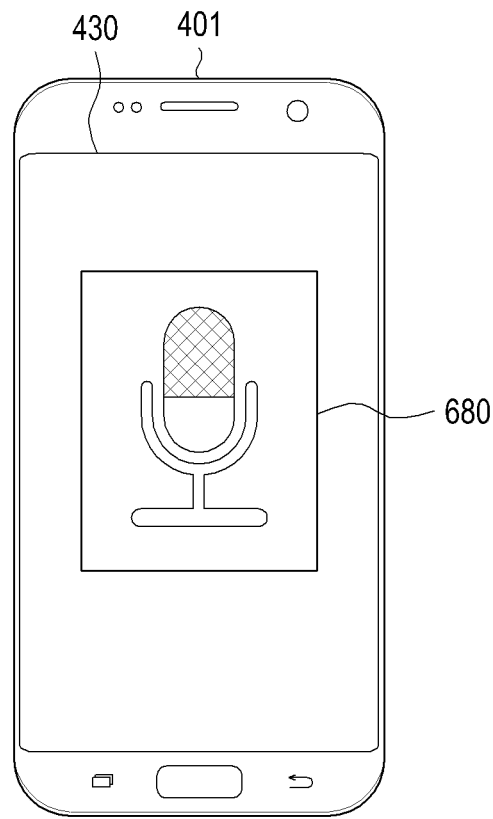
Figure 6F:
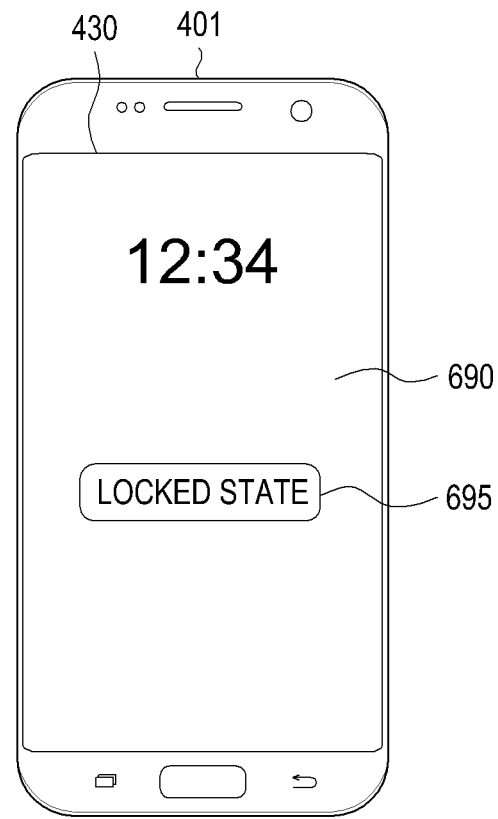

Referring to FIG. 6E, according to an embodiment of the present disclosure, the first electronic device 401 may perform the third authentication using the third authentication information. For example, the first electronic device 401 may perform the third authentication before the predetermined for the standby state expires.

The first electronic device 401 may display, on the touchscreen 430, an input window 680 (e.g., a screen with a microphone) for obtaining the third authentication information BI3. For example, where the third authentication information BI3 is the user's voice information, the first electronic device 401, upon displaying the input window 680, may activate the third sensor 445 (e.g., a microphone), obtain the user's voice information using the third sensor 445, and perform the third authentication to determine whether the user is a registered user or not using the obtained voice information.

When the third authentication succeeds, the first electronic device 401 may compare the authentication level of the first authentication information BI1 with the authentication level of the third authentication information BI3 and release the standby state depending on a result of the comparison.

Referring to FIG. 6D, since the authentication level of the third authentication information BI3 (voice information) is lower than the authentication level of the first authentication information BI1 (fingerprint information), the first electronic device 401 may release the standby state alone. For example, when the third authentication succeeds, the first electronic device 401 may display, on the touchscreen 430, a lock screen 690 corresponding to the release of the standby state.

Further, the first electronic device 401 may send again a request for the first authentication to release the locked state. For example, the first electronic device 401 may display an object 695 to indicate the 'locked state' on the lock screen 630.

FIGS. 7A, 7B, 7C, 7D, 7E and 7F are diagrams illustrating example user interfaces provided by a first electronic device according to an embodiment of the present disclosure.

Figure 7A:
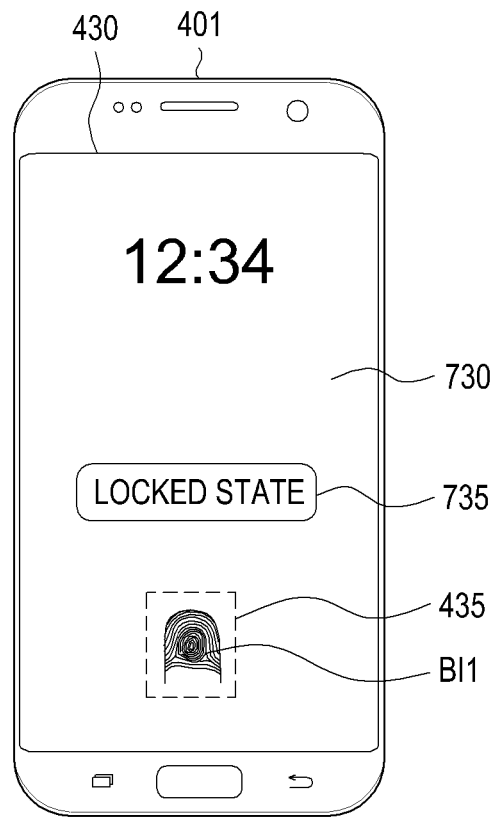
FIGS. 7A, 7B, 7C, 7D, 7E and 7F are diagrams illustrating example user interfaces provided by a first electronic device according to an embodiment of the present disclosure.

Referring to FIG. 7A, the first electronic device 401 (e.g., the processor 410) may display, on the touchscreen 430, a lock screen 730 for the locked state. The first electronic device 401 may display an object 735 to indicate the 'locked state' on the lock screen 730.

The first electronic device 401 may perform the first authentication to release the locked state using the first sensor 435. For example, where the first authentication information BI1 is the user's fingerprint information, the first electronic device 401 may obtain the user's fingerprint information using the first sensor 435 and perform the first authentication to determine whether the user is a registered user using the obtained fingerprint information.

Figure 7B:
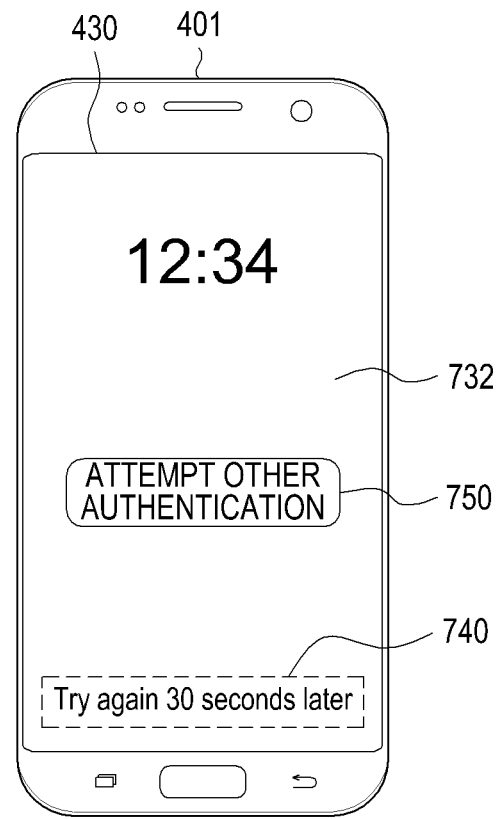

Referring to FIG. 7B, when the first authentication fails a designated number of times, the first electronic device 401 may display, on the touchscreen 430, a standby screen 732 to put the first authentication corresponding to the failure in the first authentication on hold for a predetermined time. Further, the first electronic device 401 may activate the timer to put the first authentication on hold for the predetermined time and display information 740 about the timer on the standby screen 732.

The first electronic device 401 may display, on the standby screen 732, an object 750 to indicate an 'attempt other authentication' to attempt other authentication before the predetermined time expires. For example, when the first electronic device moves or a predetermined time elapses, the first electronic device 401 may display, on the standby screen 732, the object 750 indicating the 'attempt other authentication.'

The first electronic device 401 may perform the second authentication or third authentication in response to a touch input to the object 750 indicating the 'attempt other authentication.'

Figure 7C:
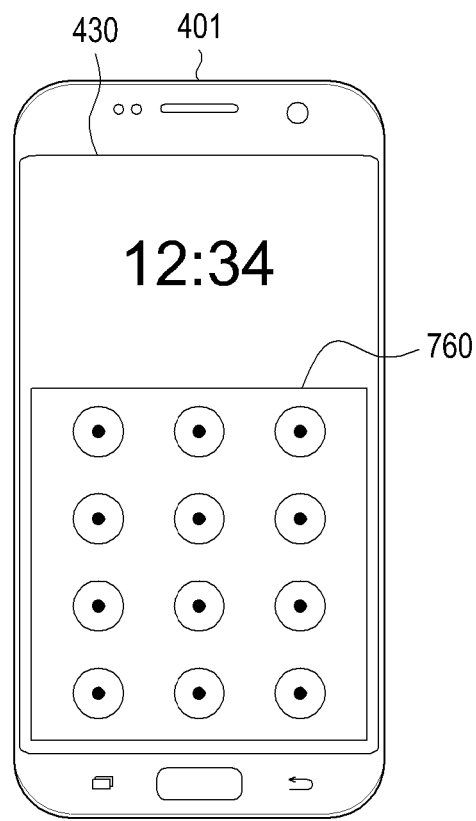

Referring to FIG. 7C, the first electronic device 401 may perform authentication using pattern information.

The first electronic device 401 may display, on the touchscreen 430, a screen 760 to obtain pattern information. For example, the first electronic device 401 may obtain pattern information via the touchscreen 430 and perform authentication to determine whether the user is a registered user or not using the obtained pattern information.

When the authentication succeeds, the first electronic device 401 may compare the authentication level of the first authentication information BI1 with the authentication level of the pattern information and release the standby state depending on a result of the comparison.

Figure 7D:
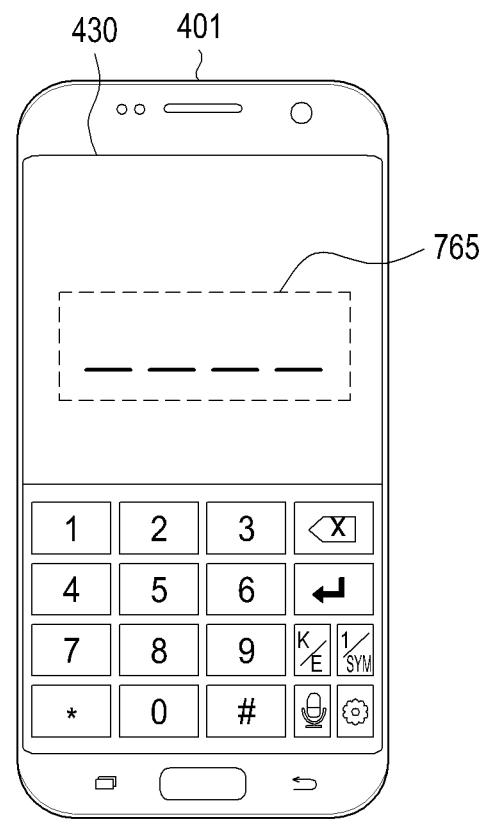

Referring to FIG. 7D, the first electronic device 401 may perform authentication using a pin code.

The first electronic device 401 may display, on the touchscreen 430, a screen 765 to obtain a pin code. For example, the first electronic device 401 may obtain a pin code via the touchscreen 430 and perform authentication to determine whether the user is a registered user or not using the obtained pin code.

When the authentication succeeds, the first electronic device 401 may compare the authentication level of the first authentication information BI1 with the authentication level of the pin code and release the standby state depending on a result of the comparison.

Figure 7E:
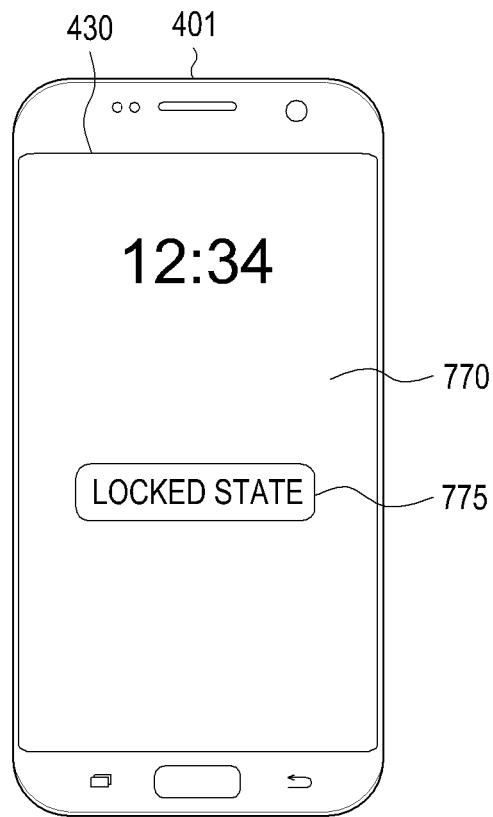

Referring to FIG. 7E, when the authentication level of the pattern information or pin code is lower than the authentication level of the first authentication information BI1 (fingerprint information), the first electronic device 401 may release the standby state alone. For example, when the authentication using the pattern information or pin code succeeds, the first electronic device 401 may display, on the touchscreen 430, a lock screen 770 corresponding to the release of the standby state.

Further, the first electronic device 401 may send again a request for the first authentication information to unlock. For example, the first electronic device 401 may display an object 775 to indicate the 'locked state' on the lock screen 770.

Figure 7F:
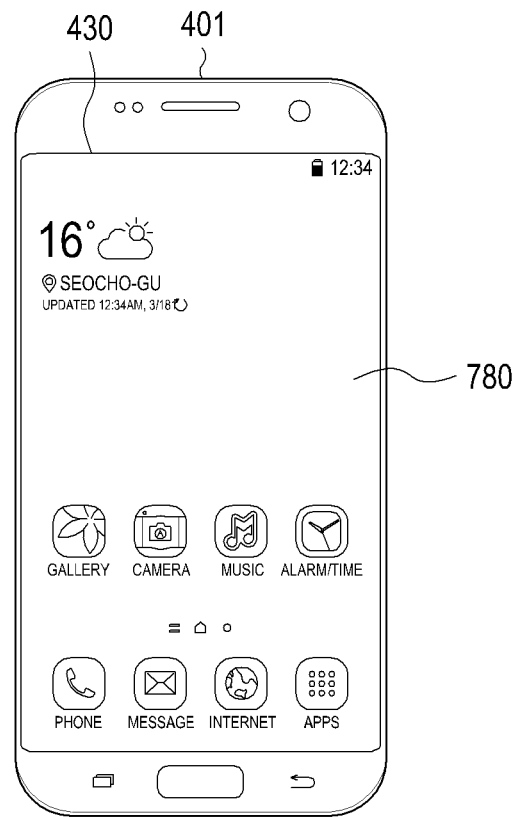

Referring to FIG. 7F, when the authentication level of the pattern information or pin code is higher than the authentication level of the first authentication information BI1 (fingerprint information), the first electronic device 401 may release the standby state and the locked state. For example, when the authentication using the pattern information or pin code succeeds, the first electronic device 401 may display, on the touchscreen 430, a screen 780 corresponding to the release of the locked state.

Figure 8:
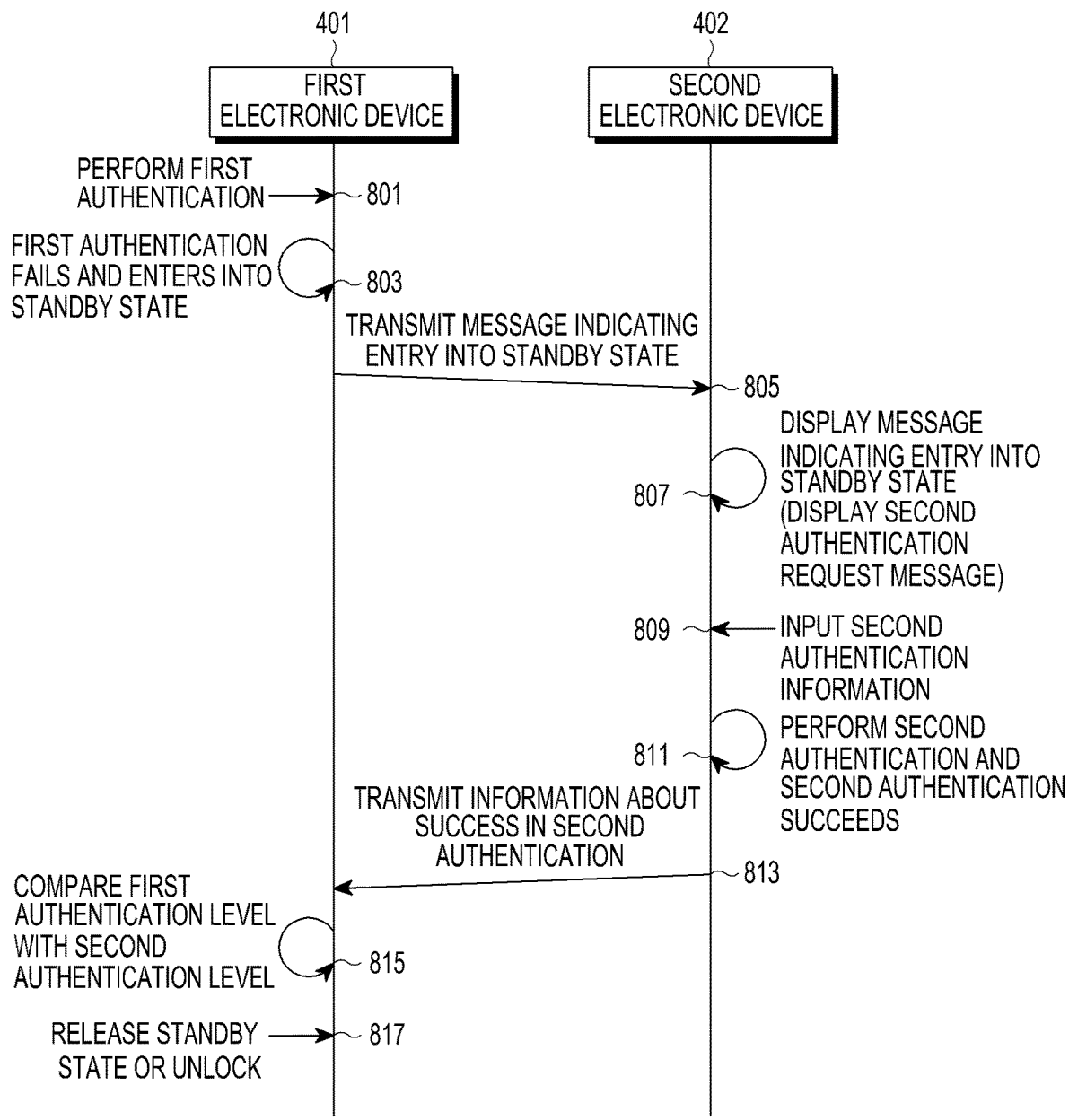
FIG. 8 is a flowchart illustrating example operations of a first electronic device and a second electronic device according to an embodiment of the present disclosure.

FIG. 8 is a flowchart illustrating example operations of a first electronic device and a second electronic device according to an embodiment of the present disclosure.

Referring to FIG. 8, the first electronic device 401 (e.g., the processor 410) may perform first authentication through the first sensor 435 to release the locked state (801).

When the first authentication fails a designated number of times, the first electronic device 401 may enter into the standby state (803). For example, upon entry into the standby state, the first electronic device 401 may activate the timer to put the first authentication on hold for a predetermined time. At this time, the first electronic device 401 may display the time to put the first authentication on hold through the timer.

The first electronic device 401 may transmit information NI indicating entry into the standby state to the second electronic device 402 (805).

The second electronic device 402 (e.g., the processor 460) may display, on the touchscreen 480, a message to indicate the standby state of the first electronic device 401 and/or a message to request the second authentication (807).

The second electronic device 402 may perform authentication using at least one of the first sensor 485, the second sensor 490, and the third sensor 495 before the standby time of the first electronic device 401 expires. For example, before the standby time of the first electronic device 401 expires, the second electronic device 402 may send a request for the second authentication information for second authentication to release the standby state (or locked state) to the touchscreen 480. Further, when the second authentication is complete, the second electronic device 402 may display a message to indicate that the standby state (or locked state) is released.

Before the standby time of the first electronic device 401 expires, the second electronic device 402 may obtain the second authentication information through the second sensor 490 (809) and perform the second authentication using the second authentication information (811).

When the second authentication information BI2 obtained through the second sensor 490 is the same or significantly similar to the authentication information stored in the memory 470, the second electronic device 402 may determine that the second authentication has succeeded (811).

When the second authentication succeeds, the second electronic device 402 may transmit information AI about the success in the second authentication to the first electronic device 401 (813).

The first electronic device 401 may compare the first authentication level of the first authentication information BI1 with the second authentication level of the second authentication information BI2 (815).

When the first authentication level is higher than the second authentication level, the first electronic device 401 may release the standby state (817). For example, as the standby state is released, the first electronic device 401 may deactivate the timer.

When the first authentication level is lower than the second authentication level, the first electronic device 401 may release the standby state and the locked state (817).

FIGS. 9A, 9B, 9C, 9D, 9E, 9F, 9G and 9H are diagrams illustrating example user interfaces provided by a first electronic device and a second electronic device according to an embodiment of the present disclosure.

Figure 9A:
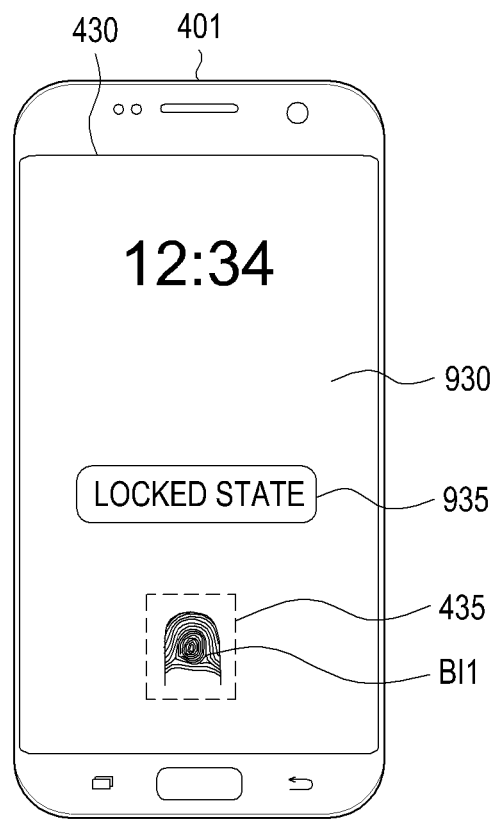

Referring to FIG. 9A, the first electronic device 401 may display, on the touchscreen 430, a lock screen 930 for the locked state. The first electronic device 401 may display an object 935 to indicate the 'locked state' on the lock screen 930.

The first electronic device 401 may perform the first authentication to release the locked state using the first sensor 435. For example, where the first authentication information BI1 is the user's fingerprint information, the first electronic device 401 may obtain the user's fingerprint information using the first sensor 435 and perform the first authentication to determine whether the user is a registered user using the obtained fingerprint information.

Figure 9B:
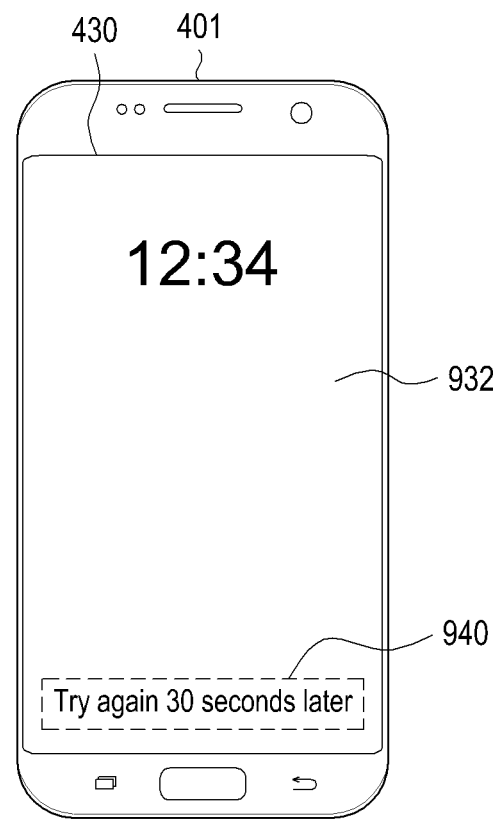

Referring to FIG. 9B, when the first authentication fails a designated number of times, the first electronic device 401 may display, on the touchscreen 430, a standby screen 932 to put the first authentication corresponding to the failure in the first authentication on hold for a predetermined time. Further, the first electronic device 401 may activate the timer to put the first authentication on hold for the predetermined time and display information 940 about the timer on the standby screen 932.

The first electronic device 401 may transmit information NI indicating entry into the standby state to the second electronic device 402.

Referring to FIG. 9C, the second electronic device 402 may display a message 950 to indicate that the first electronic device 401 is in the state of having entered the standby state and to release the standby state.

Before the predetermined time expires, the second electronic device 402 may perform at least one of the first authentication, the second authentication, and the third authentication. For example, upon touching the message 950 to indicate the standby state of the first electronic device 401 and to release the standby state, the second electronic device 402 may perform at least one of the first authentication, the second authentication, and the third authentication.

Referring to FIG. 9D, the second electronic device 402 may perform authentication using a voice sensor.

For example, the second electronic device 402 may display an input window 960 (e.g., an input screen with a microphone) to obtain voice information. When the input window 960 is displayed, the second electronic device 402 may activate the third sensor (e.g., the microphone) 495 to obtain the user's voice information and perform authentication to determine whether the user is a registered one using the obtained voice information. When the authentication succeeds, the second electronic device 402 may transmit information AI about the success in authentication to the first electronic device 401.

Referring to FIG. 9E, the first electronic device 401 may display a screen 970 corresponding to the release of the standby state.

For example, the first electronic device 401 may compare the first authentication level of the first authentication information BI1 with the second authentication level of the second authentication information BI2 based on the information AI about the authentication success received from the second electronic device 402.

Since the first authentication level is higher than the second authentication level, the first electronic device 401 may release the standby state alone and display a lock screen 970 corresponding to the release of the standby state. Further, the first electronic device 401 may send again a request for the first authentication information to unlock. For example, the first electronic device 401 may display an object 975 to indicate the 'locked state' on the lock screen 970.

Figure 9F:
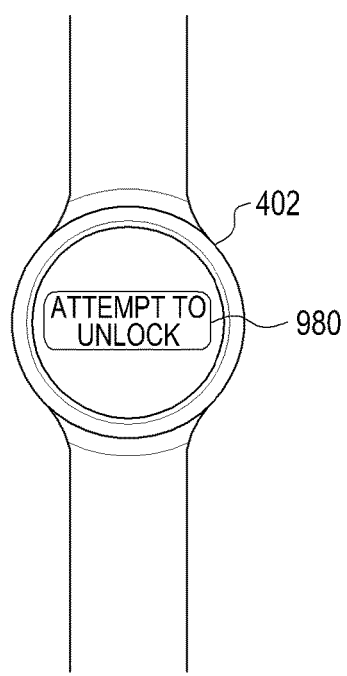

Referring to FIG. 9F, the second electronic device 402 may display a message 980 to release the locked state of the first electronic device 401.

Before the predetermined time expires, the second electronic device 402 may perform at least one of the first authentication, the second authentication, and the third authentication. For example, upon touching the message 980 to release the standby state, the second electronic device 402 may perform at least one of the first authentication, the second authentication, and the third authentication.

Figure 9G:
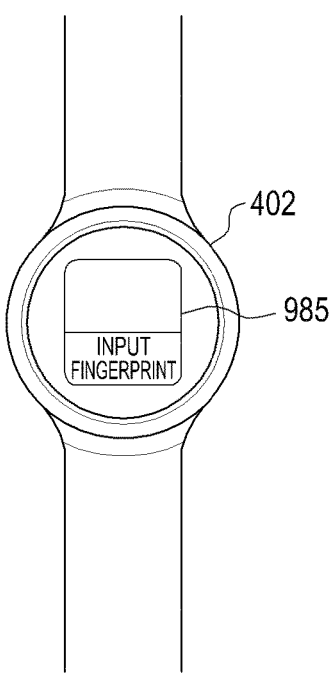

Referring to FIG. 9G, the second electronic device 402 may perform authentication using a fingerprint sensor.

For example, the second electronic device 402 may display an input window 985 (e.g., a screen with a window for entering fingerprint) to obtain fingerprint information. The second electronic device 402 may obtain the user's fingerprint information entered to the input window 985 using the fingerprint sensor and perform authentication to determine whether the user is a registered one using the obtained fingerprint information. When the authentication succeeds, the second electronic device 402 may transmit information AI about the success in authentication to the first electronic device 401.

Figure 9H:

Referring to FIG. 9H, the first electronic device 401 may display a screen 990 corresponding to the release of the locked state.

For example, the first electronic device 401 may compare the first authentication level of the first authentication information BI1 with the second authentication level of the second authentication information BI2 based on the information AI about the authentication success received from the second electronic device 402.

When the second authentication level is higher than the first authentication level, the first electronic device 401 may release the locked state and display a screen 990 where the locked state has been released.

Figure 10:
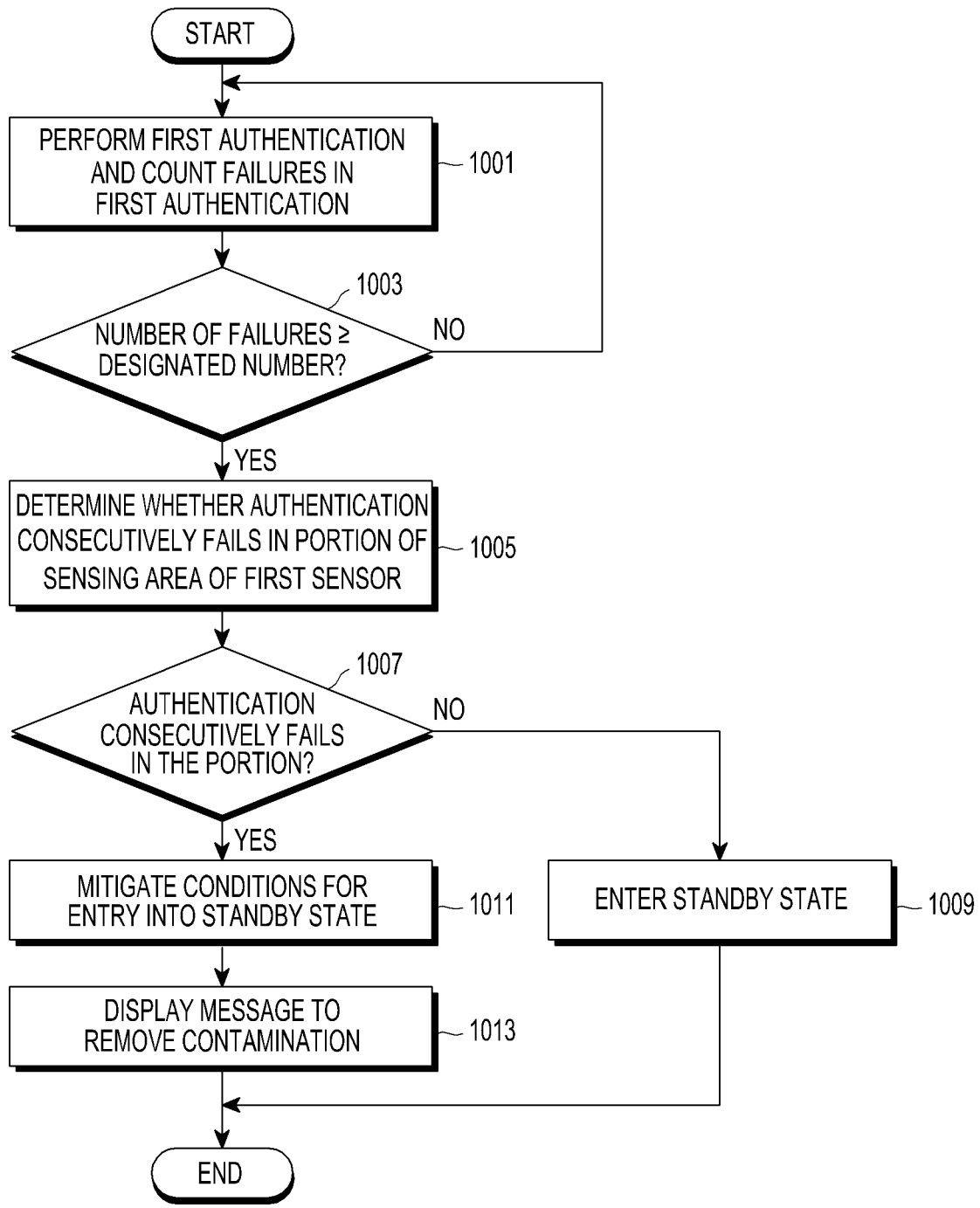
FIG. 10 is a flowchart illustrating example operations of a first electronic device according to an embodiment of the present disclosure.

FIG. 10 is a flowchart illustrating example operations of a first electronic device according to an embodiment of the present disclosure.

Referring to FIG. 10, the first electronic device 401 (e.g., the processor 410) may perform first authentication through the first sensor 435 to release the locked state (1001).

According to an embodiment of the present disclosure, when the first authentication fails, the first electronic device 401 may count the failures of the first authentication (1001).

The first electronic device 401 may compare the number of failures of the first authentication with a designated number for the standby state (1003).

When the number of the failures of the first authentication is smaller than the designated number, the first electronic device 401 may abstain from entry into the standby state. At this time, the first electronic device 401 may send a request for the first authentication to unlock.

When the first authentication fails the designated number of times or more, the first electronic device 401 may determine whether the first authentication has consecutively failed in a portion of a sensing area of the first sensor 435 (1005).

Absent consecutive failures in the first authentication in the portion of the sensing area of the first sensor 435 (no in 1007), the first electronic device 401 may enter the standby state (1009).

Upon consecutive failures in the first authentication in the portion of the sensing area of the first sensor 435 (yes in 1007), the first electronic device 401 may mitigate conditions for entry into the standby state (1011). For example, the first electronic device 401 may increase the designated number for the standby state of the first electronic device 401.

Further, when the first authentication consecutively fails in the portion of the sensing area of the first sensor 435, the first electronic device 401 may determine that the portion of the first sensor 435 has been contaminated. The first electronic device 401 may display, on the touchscreen 430, a message to request to remove the contamination on the first sensor 435 (1013).

FIGS. 11A, 11B, 11C, 11D and 11E are diagrams illustrating example user interfaces provided by a first electronic device and a second electronic device according to an embodiment of the present disclosure.

Figure 11A:
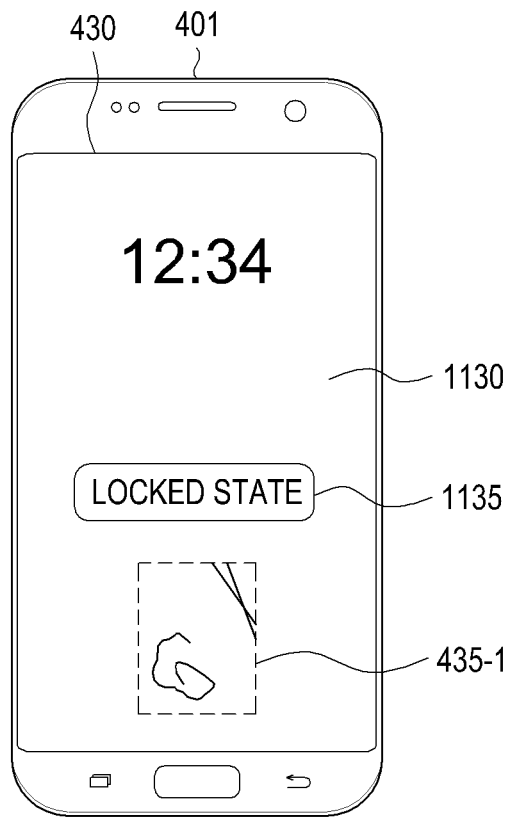
FIGS. 11A, 11B, 11C, 11D and 11E are diagrams illustrating example user interfaces provided by a first electronic device and a second electronic device according to an embodiment of the present disclosure.
Figure 11B:
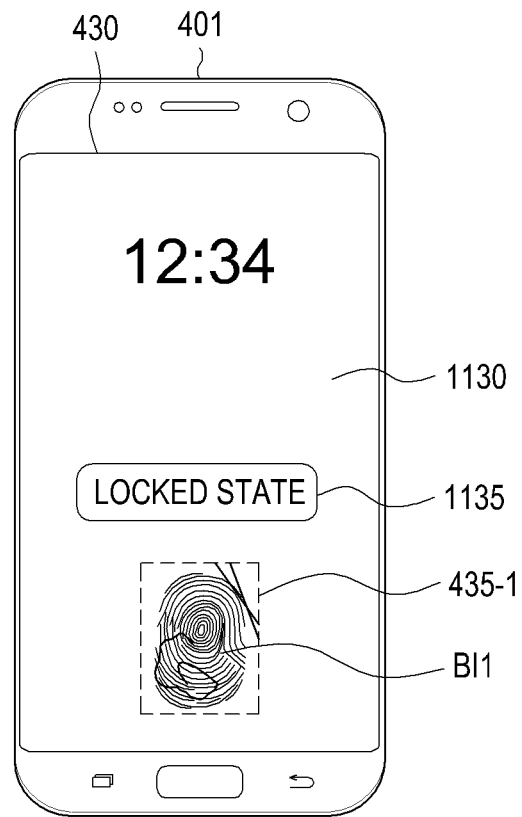

Referring to FIGS. 11A and 11B, the first electronic device 401 may display, on the touchscreen 430, a lock screen 1130 for the locked state. A first sensor 435-1 may be included in an area of the touchscreen 430.

The first sensor 435-1 may be the first sensor 435 of FIG. 4 where a portion of its sensing area has been contaminated. For example, the first sensor 435-1 may be contaminated by a liquid or solid material from the outside. The first sensor 435-1 may also be contaminated by damaging the sensing area.

The first electronic device 401 may display, on the touchscreen 430, a lock screen 1130 for the locked state. The first electronic device 401 may display an object 1135 to indicate the 'locked state' on the lock screen 1130.

The first electronic device 401 may perform the first authentication to release the locked state using the first sensor 435-1. For example, where the first authentication information BI1 is the user's fingerprint information, the first electronic device 401 may obtain the user's fingerprint information using the first sensor 435-1 and perform the first authentication to determine whether the user is a registered user using the obtained fingerprint information.

Figure 11C:
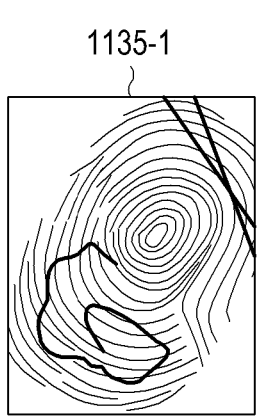

Referring to FIG. 11C, the first sensor 435-1 may sense sensing information 1135-1 about the contaminant and the first authentication information BI1. For example, when the first authentication information BI1 is the user's fingerprint information, the sensing information 1135-1 may contain overlapping information of the contaminant and the fingerprint information.

The first electronic device 401 may compare the sensing information 113501 obtained via the first sensor 435-1 with authentication information stored in the memory 420 and perform the first authentication depending on a result of the comparison. For example, the first electronic device 401 may determine that the fingerprint information differs from the overlapping information of the contaminant and the fingerprint information and thus determine that the first authentication has failed.

Figure 11D:
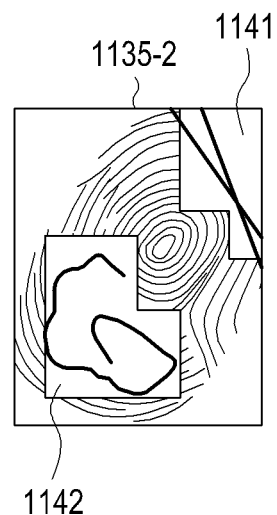

Referring to FIG. 11D, when the first authentication fails a preset number of times in the same areas 1141 and 1142 of the sensing area of the first sensor 435-1, the first electronic device 401 may determine that the same areas 1141 and 1142 of the first sensor 435-1 have been contaminated.

For example, the first electronic device 401 may determine whether the first sensor 435-1 has been contaminated by analyzing the sensing area 1135 sensed by the first sensor 435-1. When a mismatch from the authentication information stored in the memory 420 occurs a preset number of times in the first area 1141 and the second area 1142 of the first sensor 435-1, the first electronic device 401 may determine that the first area 1141 and the second area 1142 of the first sensor 435-1 have been contaminated.

Figure 11E:
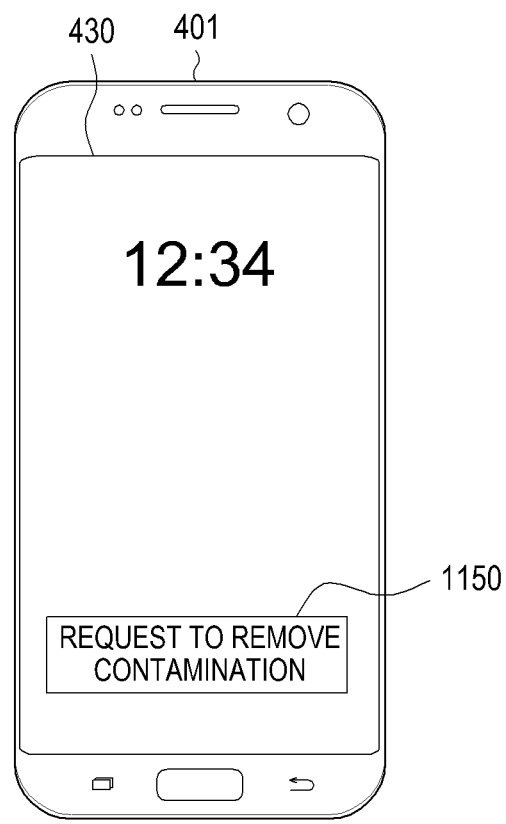

Referring to FIG. 11E, upon determining that at least one area of the first sensor 435-1 has been contaminated, the first electronic device 401 may display, on the touchscreen 430, a message 1150 to request to remove the contamination.

Upon determining that at least one area of the first sensor 435-1 has been contaminated, the first electronic device 401 may increase the number designated for entry into the standby state of the first electronic device 401.

According to an example embodiment of the present disclosure, an electronic device may comprise a first sensor configured to obtain first biometric information of a first authentication level from a user, a second sensor configured to obtain the first biometric information and/or second biometric information of a second authentication level higher than the first authentication level from the user, a memory configured to store at least one piece of biometric information authenticated in relation with the user, and a processor, wherein the processor may be configured to compare the at least one piece of biometric information with the first biometric information obtained through the first sensor while the electronic device operates in a locked state, to activate a timer to stop input to the first sensor for a designated time when authentication on the first biometric information fails a designated number of times based on the comparison of the first biometric information, to obtain the second biometric information through the second sensor while the timer is active, and to deactivate the timer when the second biometric information is authenticated on the at least one piece of biometric information.

The processor may be configured to release the locked state of the electronic device when the authentication using the second biometric information is complete.

The electronic device may further comprise a third sensor configured to obtain third biometric information of a third authentication level lower than the first authentication level, wherein the processor may be configured to obtain the third biometric information through the third sensor while the timer is active and deactivate the timer when the third biometric information is authenticated on the at least one piece of biometric information.

The processor may be configured to re-request authentication on the first biometric information to release the locked state of the electronic device.

The first sensor may include a fingerprint sensor, the second sensor may include an iris sensor, and the third sensor may include a voice sensor.

The processor may be configured to increase the designated number based on the number of failures in the authentication on the first biometric information obtained from a portion of a sensing area of the first sensor.

The electronic device may further comprise a communication module (e.g., including communication circuitry). The processor may be configured to, when the timer is activated, transmit a message to indicate the activation of the timer to an external electronic device through the communication module.

According to an example embodiment of the present disclosure, an electronic device may comprise a touchscreen, a first sensor configured to obtain first authentication information of a first type, a second sensor configured to obtain second authentication information of a second type, and a processor, wherein the processor may be configured to, when first authentication on the first authentication information of the first type to release a locked state of the electronic device using the first sensor fails a designated number of times, enter into a standby state to put input related to the first authentication on hold for a designated time, and when second authentication on the second authentication information of the second type using the second sensor succeeds before the designated time expires, release the standby state.

The processor may be configured to, when an authentication level of the first authentication is higher than an authentication level of the second authentication, release the standby state and display, on the touchscreen, a first screen where the standby state has been released.

The processor may be configured to, when the standby state is released, send a request for the first authentication information to release the locked state.

The processor may be configured to, when an authentication level of the first authentication is lower than an authentication level of the second authentication, release the standby state and the locked state and display, on the touchscreen, a second screen where the locked state has been released.

The processor may be configured to increase the designated number based on the number of failures in the first authentication on a portion of a sensor area of the first sensor.

The processor may be configured to display, on the touchscreen, a message indicating contamination of the first sensor based on the number of failures in the first authentication on a portion of a sensor area of the first sensor.

The electronic device may further comprise a communication module (e.g., including communication circuitry), wherein the processor may be configured to, upon entry into the standby state, transmit a message to indicate the standby state of the electronic device to an external electronic device through the communication module.

The processor may be configured to release the standby state when the second authentication succeeds using the external electronic device before the predetermined time expires.

The processor may be configured to obtain third authentication information of a third type through the touchscreen before the predetermined time expires and release the standby state when the third authentication using the third authentication information succeeds.

The third authentication information may include at least one of information about a designated pattern and information about a pin code.

The first authentication information and the second authentication information may include a user's biometric information. The first authentication information may differ from the second authentication information.

The first sensor may include a fingerprint sensor. The first sensor may be included in the touchscreen.

According to an example embodiment of the present disclosure, a method for operating an electronic device may comprise, when first authentication on first authentication information of a first type to release a locked state of the electronic device fails a designated number of times, entering into a standby state to put input related to the first authentication on hold for a designated time, performing second authentication on second authentication information of a second type obtained through a second sensor before the designated time expires, and releasing the standby state when the second authentication succeeds.

According to an embodiment of the present disclosure, a computer-readable recording medium may store a program that when executed by a processor, causes an electronic device to perform operations comprising, when first authentication on first authentication information of a first type to release a locked state of the electronic device fails a designated number of times, entering into a standby state to put input related to the first authentication on hold for a designated time, performing second authentication on second authentication information of a second type obtained through a second sensor before the designated time expires, and releasing the standby state when the second authentication succeeds.

Each of the aforementioned components of the electronic device may include one or more parts, and a name of the part may vary with a type of the electronic device. The electronic device in accordance with various embodiments of the present disclosure may include at lest one of the aforementioned components, omit some of them, or include other additional component(s). Some of the components may be combined into an entity, but the entity may perform the same functions as the components may do.

As is apparent from the foregoing description, according to various example embodiments of the present disclosure, upon entry into a standby state to put first authentication on hold for a predetermined time due to failure in the first authentication using first authentication information, an electronic device may release the standby state without waiting the predetermined time by performing second authentication using second authentication information.

The various example embodiments disclosed herein are provided for description and understanding of the disclosed technology and does not limit the scope of the present disclosure. Accordingly, the scope of the present disclosure should be understood as including all changes or various embodiments based on the technical spirit of the present disclosure.

What is claimed is:

1. An electronic device, comprising:
a first sensor;
a second sensor;
a memory configured to store reference biometric information; and
a processor configured to:
obtain, via the first sensor, first biometric information, the first biometric information corresponding to a first authentication level,
perform authentication by comparing at least one piece of the reference biometric information with the obtained first biometric information while the electronic device operates in a locked state,
based on a determination that the authentication fails consecutively more than a designated number of times, activate a timer set to a designated time, wherein the first sensor is not accessible for performing authentication while the timer is activated,
obtain, via the second sensor, second biometric information while the timer is activated, the second biometric information corresponding to a second authentication level, and
when the second biometric information is authenticated by comparing at least one piece of the reference biometric information and the obtained second biometric information: deactivate the timer if the second authentication level is lower than the first authentication level, and switch the electronic device from the locked state to an unlocked state if the second authentication level is equal to or higher than the first authentication level.

2. The electronic device of claim 1, wherein each of the first authentication level and the second authentication level is determined based on a type of biometric information.

3. The electronic device of claim 1, wherein each of the first authentication level and the second authentication level is determined based on a type of sensor from which each of the first biometric information and the second biometric information is obtained.

4. The electronic device of claim 1, wherein the processor is configured to re-request authentication on the first biometric information to release the locked state of the electronic device if the second authentication level is lower than the first authentication level.

5. The electronic device of claim 1, wherein the first sensor includes a fingerprint sensor, the second sensor includes an iris sensor.

6. The electronic device of claim 1, wherein the processor is configured to increase the designated number of times when the authentication fails consecutively more than a specific number of times using the first biometric information obtained from a same portion of a sensing area of the first sensor.

7. The electronic device of claim 1, wherein the processor is further configured to transmit, via a communication circuit of the electronic device, a message indicating of that the timer is activated to an external electronic device, when the timer is activated.

8. The electronic device of claim 7, wherein the processor is further configured perform authentication on third biometric information to deactivate the timer using the external electronic device while the time is activated.

9. The electronic device of claim 1, wherein the processor is further configured to:
obtain, via a touchscreen of the electronic device, authentication information to deactivate the timer while the timer is activated, and
deactivate the timer when the authentication information is authenticated.

10. The electronic device of claim 9, wherein the authentication information includes at least one of: information about a designated pattern and information about a pin code.

11. A method of operating an electronic device, the method comprising:
obtaining, via a first sensor of the electronic device, first biometric information, the first biometric information corresponding to a first authentication level;
performing authentication by comparing at least one piece of reference biometric information stored in the electronic device with the obtained first biometric information while the electronic device operates in a locked state; based on a determination that the authentication fails consecutively more than a designated number of times, activating a timer set to a designated time, wherein first sensor is not accessible for performing authentication while the timer is activated;
obtaining, via a second sensor of the electronic device, second biometric information while the timer is activated, the second biometric information corresponding to a second authentication level, and
when the second biometric information is authenticated by comparing at least one piece of the reference biometric information and the obtained second biometric information:
deactivating the timer if the second authentication level is lower than the first authentication level, and
switching the electronic device from the locked state to an unlocked state if the second authentication level is equal to or higher than the first authentication level.

12. The method of claim 11, wherein each of the first authentication level and the second authentication level is determined based on a type of biometric information.

13. The method of claim 11, wherein each of the first authentication level and the second authentication level is determined based on a type of sensor from which each of the first biometric information and the second biometric information is obtained.

14. The method of claim 11, further comprising:
requesting authentication on the first biometric information to release the locked state of the electronic device if the second authentication level is lower than the first authentication level.

15. The method of claim 11, wherein the first sensor includes a fingerprint sensor, the second sensor includes an iris sensor or a voice sensor.

16. The method of claim 11, further comprising:
increasing the designated number of times when the authentication fails consecutively more than a specific number of times using the first biometric information obtained from a same portion of a sensing area of the first sensor.

17. The method of claim 11, further comprising:
transmitting, via a communication circuit of the electronic device, a message indicating that the timer is activated to an external electronic device, when the timer is activated.

18. The method of claim 17, further comprising:
performing authentication on third biometric information to deactivate the timer using the external electronic device while the timer is activated.

19. The electronic device of claim 11, further comprising:
obtaining, via a touchscreen of the electronic device, authentication information to deactivate the timer while the timer is activated, and
deactivating the timer when the authentication information is authenticated.

20. The electronic device of claim 19, wherein the authentication information includes at least one of: information about a designated pattern and information about a pin code.

* * * * *